(12) United States Patent
Aoki et al.

(10) Patent No.: US 8,141,671 B2
(45) Date of Patent: Mar. 27, 2012

(54) HOOD LIFT-UP APPARATUS

(75) Inventors: Masashi Aoki, Aichi-ken (JP); Hiroyuki Takahashi, Nishikamo-gun (JP)

(73) Assignees: Toyoda Gosei Co., Ltd., Aichi-pref. (JP); Toyota Jidosha Kabushikikaisha, Toyota-shi (JP)

( * ) Notice: Subject to any disclaimer, the term of this patent is extended or adjusted under 35 U.S.C. 154(b) by 564 days.

(21) Appl. No.: 12/320,671

(22) Filed: Jan. 30, 2009

(65) Prior Publication Data

US 2009/0229901 A1    Sep. 17, 2009

(30) Foreign Application Priority Data

Feb. 1, 2008  (JP) ............................. 2008-022985
Oct. 9, 2008  (JP) ............................. 2008-263161

(51) Int. Cl.
*B60K 28/10*        (2006.01)

(52) U.S. Cl. ............... 180/69.21; 180/274; 296/187.04

(58) Field of Classification Search ................ 180/69.2, 180/69.21, 271, 274; 296/193.11, 187.04
See application file for complete search history.

(56) References Cited

U.S. PATENT DOCUMENTS

| | | | | |
|---|---|---|---|---|
| 6,182,782 B1* | 2/2001 | Matsuura et al. | ............ | 180/274 |
| 6,364,402 B1* | 4/2002 | Sasaki | .............. | 296/187.09 |
| 6,520,276 B2* | 2/2003 | Sasaki et al. | .............. | 180/274 |
| 6,530,449 B2* | 3/2003 | Sasaki et al. | .............. | 180/274 |
| 6,554,093 B2* | 4/2003 | Sasaki et al. | .............. | 180/274 |
| 6,571,901 B2* | 6/2003 | Lee | .............. | 180/274 |
| 7,293,624 B2* | 11/2007 | Adachi | .............. | 180/274 |
| 7,374,008 B1* | 5/2008 | Neal et al. | .............. | 180/274 |
| 7,527,121 B2* | 5/2009 | Kitte et al. | .............. | 180/274 |
| 7,621,364 B2* | 11/2009 | Haglund | .............. | 180/274 |
| 7,650,957 B2* | 1/2010 | Takakura et al. | .............. | 180/274 |
| 2002/0011371 A1* | 1/2002 | Sasaki et al. | .............. | 180/274 |
| 2002/0033294 A1* | 3/2002 | Ishizaki et al. | .............. | 180/274 |
| 2002/0043417 A1* | 4/2002 | Ishizaki et al. | .............. | 180/274 |
| 2005/0179286 A1* | 8/2005 | Adachi | .............. | 296/193.11 |
| 2005/0257980 A1* | 11/2005 | Green et al. | .............. | 180/274 |

(Continued)

FOREIGN PATENT DOCUMENTS

JP    U-03-83177    8/1991

(Continued)

OTHER PUBLICATIONS

Notice of Reasons for Refusal mailed on Dec. 8, 2009 issued from the Japanese Patent Office in the corresponding Japanese patent application No. 2008-263161 (English translation).

*Primary Examiner* — John R Olszewski
(74) *Attorney, Agent, or Firm* — Posz Law Group, PLC

(57) ABSTRACT

A hood lift-up apparatus of the invention is arranged on a lower side of a rear end of a hood panel of a vehicle and includes an actuator of a constitution of fixing a cylinder in a shape of a circular cylinder arranged by making an axial direction thereof substantially in line with a vertical direction to a body member of a vehicle by utilizing an attaching bracket. The attaching bracket is constructed by a constitution of including a holding portion of holding the cylinder by being disposed on a rear portion side constituting a side of the cylinder, and an attaching portion arranged on a front side of the cylinder by being extended to the front side from the holding portion and is fixed to a body member at a portion of the attaching portion.

6 Claims, 22 Drawing Sheets

U.S. PATENT DOCUMENTS

| | | | |
|---|---|---|---|
| 2006/0024994 A1* | 2/2006 | Kato | 439/92 |
| 2006/0118348 A1* | 6/2006 | Haglund | 180/274 |
| 2006/0213709 A1* | 9/2006 | Yamaguchi et al. | 180/69.21 |
| 2006/0290172 A1* | 12/2006 | Hirata et al. | 296/187.04 |
| 2007/0251750 A1* | 11/2007 | Takakura et al. | 180/274 |
| 2008/0156556 A1* | 7/2008 | Takahashi | 180/69.21 |
| 2008/0308338 A1* | 12/2008 | Kitte et al. | 180/271 |

FOREIGN PATENT DOCUMENTS

| | | |
|---|---|---|
| JP | A-11-115680 | 4/1999 |
| JP | A-11-348716 | 12/1999 |
| JP | A-2003-182510 | 7/2003 |
| JP | A-2004-308785 | 11/2004 |
| JP | A-2005-225392 | 8/2005 |

* cited by examiner

HOOD LIFT-UP APPARATUS

BACKGROUND OF THE INVENTION

1. Field of the Invention

The present invention relates to a hood lift-up apparatus used in receiving a pedestrian by a hood panel a rear end of which is lifted up when the pedestrian is brought into contact with a vehicle.

2. Related Art

In a background art, a hood lift-up apparatus is constructed by a constitution of including an actuator having a cylinder in a shape of a circular pillar arranged by making an axial direction thereof substantially in line with a vertical direction, and a piston rod arranged to project upward from the cylinder, and is constructed by a constitution of arranging the cylinder to a lower side of a rear end of a hood panel of a vehicle to be fixed to a body member of the vehicle and lifting up the rear end of the hood panel by bringing an upper end of the piston rod which is moving up into contact with a lower face side of the rear end of the hood panel in being operated (refer to, for example, JP-A-11-348716). The hood lift-up apparatus of the background art is constructed by a constitution of attaching the actuator to an attaching seat of the body member by arranging flange portions substantially in a shape of a quadrangular plate extended from the cylinder to both front and rear sides at 4 portions of the actuator and fastening the respective flange portions by bolts in a state of interposing a reinforcing member in a plate-like shape between the flange portion and the attaching seat provided at the body member.

However, the hood lift-up apparatus of the background art is constructed by the constitution of fixing the actuator to the body member by fastening the flange portions provided at 4 portions at positions of being symmetric with each other in a direction orthogonal to the axis of the cylinder, that is, at positions remote from each other on upper and lower sides and front and rear sides to ride over the cylinder by the bolts respectively to the attaching seats of the body member of the vehicle in a state of interposing the reinforcing member, and therefore, the constitution is complicated and also a number of attaching steps is required, and there is a room for improvement in reducing a number of fabricating steps and the number of attaching steps.

SUMMARY OF THE INVENTION

The invention resolves the above-described problem and it is an object thereof to provide a hood lift-up apparatus capable of being fixed to a body member easily by a simple constitution.

A hood lift-up apparatus according to the invention includes a cylinder in a shape of a circular cylinder arranged on a lower side of a rear end of a hood panel of a vehicle and arranged by making an axial direction thereof in line with a vertical direction, and a piston rod arranged to project from the cylinder to an upper side;

wherein an actuator of fixing the cylinder to a body member of the vehicle by using an attaching bracket moves up the rear end of the hood panel by bringing an upper end of the piston rod which is moving up into contact with a side of a lower face of the rear end of the hood panel in being operated and a pedestrian is received by the hood panel in being moved up;

wherein the piston rod is constructed by a constitution in which a kinetic energy of the pedestrian can be absorbed by bending to plastically deform the upper end to be directed to a rear side in accordance with a downward movement of the hood panel in receiving the pedestrian by the hood panel; and wherein the attaching bracket is constituted to include a holding portion disposed on a side of a rear portion constituting a side of the cylinder for holding the cylinder, and an attaching portion extended from the holding portion to a front side and arranged on a front side of the cylinder and is fixed to the body member at a portion of the attaching portion.

According to the hood lift-up apparatus of the invention, the actuator is constituted to be fixed to the body member of the vehicle by utilizing the attaching bracket, the actuator is fixed to the body member by utilizing the attaching bracket including the holding portion of holding the cylinder and the attaching portion extended from the holding portion to the front side and arranged on the front side of the cylinder and utilizing only the portion of the attaching portion, and therefore, a simple constitution can be constructed in comparison with a case of fixing the cylinder by interposing a reinforcing member and fastening the cylinder by bolts at a plurality of portions remote from each other in an up and down direction and in a front and rear direction to ride over the cylinder as in the background art. Further, according to the hood lift-up apparatus of the invention, the attaching bracket is fixed to the body member only at a position constituting the front side of the cylinder, and therefore, operation time in fixing can be reduced and a number of fabricating steps can be reduced in comparison with a case of fixing the attaching bracket to the body member on both front and rear sides of the cylinder as in the background art.

Therefore, the hood lift-up apparatus of the invention can be fixed to the body member easily by a simple constitution.

Further, according to the hood lift-up apparatus of the invention, after operating the actuator, when the pedestrian is received by the hood panel the rear end of which is moved up, the piston rod the upper end of which is brought into contact with the side of the lower face of the rear end of the hood panel is bent to be plastically deformed to direct the upper end to the rear side, and the kinetic energy of the pedestrian can be received. At this occasion, according to the hood lift-up apparatus of the invention, the actuator is fixed to the body member at the portion of the attaching portion of the attaching bracket extended to the front side of the holding portion of holding the cylinder and arranged on the front side of the cylinder, and therefore, when the pedestrian is butted to a rear end of the hood panel to push down the hood panel, and the upper end of the piston rod is operated with a force of pushing down the upper end in the rear lower direction, the cylinder is operated with only a rotational moment of rotating the upper end side to the rear side by constituting a fulcrum by the portion of the attaching portion on the front side of a center axis. In other words, according to the hood lift-up apparatus of the invention, when the hood panel is pushed down, there is not brought about a rotational moment of rotating the upper end side to the front side at the cylinder. Therefore, the cylinder is not moved to rotate to hamper the bending plastic deformation of the piston rod to the rear side, and the piston rod can firmly be bent to plastically deform to direct to the rear side. As a result, according to the hood lift-up apparatus of the invention, the piston rod can stably be bent to plastically deform to the rear side and the kinetic energy of the pedestrian can stably be absorbed.

Naturally, it can be taken into consideration to construct a constitution of absorbing the kinetic energy of the pedestrian by bending to plastically deform the upper end to direct to the front side, when the piston rod is bent to plastically deform to direct the upper end to the front side, the piston rod is arranged to make the upper end temporarily opposed to the direction of moving the pedestrian in the plastic deformation, thereafter, deformed to direct to the upper end to the front side, and therefore, a reaction force against the walker is large, and there is a concern of being unable to smoothly protect the pedestrian. Therefore, it is preferable to bent to plastically deform the piston rod to direct the upper end to the rear side.

Further, in the hood lift-up apparatus of the invention, it is preferable that the body member includes an attaching seat having an attaching face substantially along the vertical direction;

wherein the attaching portion is constituted by substantially a shape of a plate along substantially a front and rear direction and along substantially the vertical direction to be in line with the attaching face, and constituted to be arranged with a plurality of pieces of attaching holes of inserting attaching means for fixing to the attaching seat substantially along an up and down direction;

wherein the holding portion includes a bent portion constituted by being bent to cover an outer peripheral face of the cylinder over substantially a half periphery from a rear face side to a front face side at least in a region on a rear side of the attaching hole on an upper end side and a region on a rear side of the attaching hole on a lower end side; and wherein the bent portion is constituted to hold the cylinder to support the front face side and the rear face side of the cylinder by fixedly attaching a side of an inner peripheral face thereof to an outer peripheral face of the cylinder.

According to the hood lift-up apparatus of the above-described constitution, the attaching portion includes a plurality of pieces of attaching holes of inserting the attaching means for fixing to the attaching seat substantially in the up and down direction, and therefore, the holding portion per se of holding the cylinder can solidly be attached to the body member by the attaching portion by restraining rocking in the front and rear direction, further, according to the above-described hood lift-up apparatus, the cylinder is held by supporting the front face side and the rear face side of the cylinder at least at the region on the rear side of the attaching hole on the upper end side and the region on the rear side of the attaching hole on the lower end side, and therefore, the end portion side in the up and down direction of the cylinder can firmly be prevented from being rotated along the front and rear direction. That is, it is predicted that at an initial stage of the bending plastic deformation of the piston rod, a rotational moment of directing the upper end to the rear side and directing the lower end side to the front side is operated, and when the bending plastic deformation is progressed, the cylinder is operated with a rotational moment of directing the upper end side to the front side and directing the lower end side to the rear side. However, according to the above-described hood lift-up apparatus, at the initial stage of the bending plastic deformation of the piston rod, at the region of the upper end side on the lower side of the attaching hole, the bent portion arranged to cover the rear face side of the cylinder supports the rear face of the cylinder, at the region of the lower end side on the rear side of the attaching hole, the bent portion arranged to cover the front face side of the cylinder supports the front face of the cylinder, in the state of progressing the bending plastic deformation, at the region of the upper end side on the front side of the attaching hole, the bent portion arranged to cover the front face side of the cylinder supports the front face of the cylinder, at the region of the lower end side on the rear side of the attaching hole, the bent portion arranged to cover the rear face side of the cylinder supports the rear face of the cylinder, and therefore, it can precisely be prevented that the cylinder is rotated to direct the upper end side or the lower end side to the front side by receiving the rotational moment operated during a time period from the initial stage to the final stage of the bending plastic deformation.

DETAILED DESCRIPTION OF THE PREFERRED EMBODIMENTS

An embodiment of the invention will be explained in reference to the drawings as follows. According to the specification, a front and rear direction and an up and down direction respectively coincide with a front and rear direction and an up and down direction of a vehicle V, and a left and right direction coincides with a left and right direction when a rear side is viewed from a front side of the vehicle V unless particularly specified otherwise.

Figure 1:
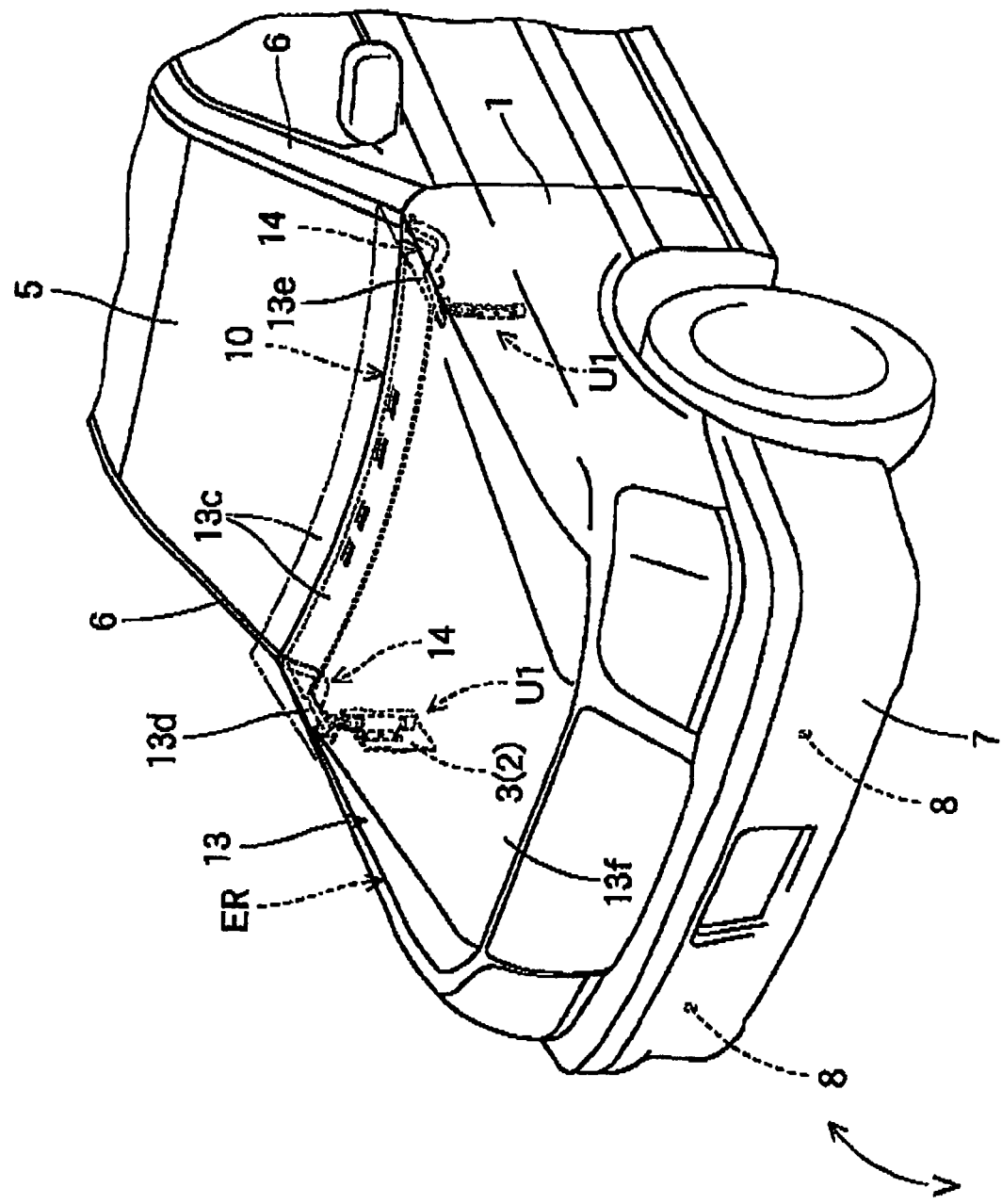
FIG. 1 is a perspective view of a vehicle mounted with a hood lift-up apparatus according to an embodiment of the invention.
Figure 2:
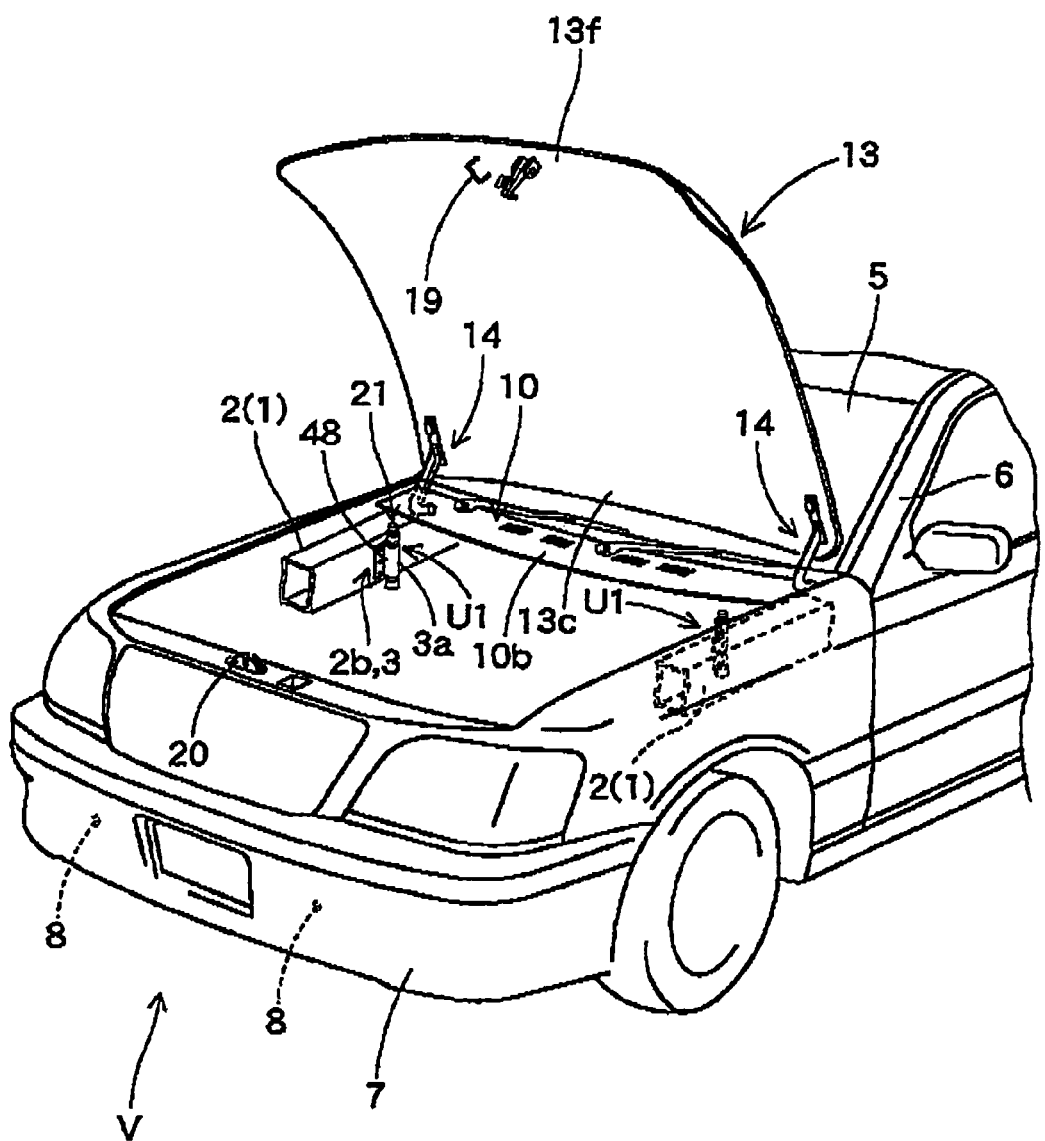
FIG. 2 is an outline perspective view of a state of opening a hood panel in the vehicle mounted with the hood lift-up apparatus of the embodiment.

As shown by FIGS. 1, 2, a hood lift-up apparatus (hereinafter, abbreviated as "lift-up apparatus") U of the embodiment is arranged on a rear side of a rear end 13c of a hood panel 13 of a vehicle V and is constructed by a constitution of making the rear end 13c of the hood panel 13 lift-up by moving up a piston rod 37 of an actuator 21 mentioned later when operated. In the case of the embodiment, as shown by FIG. 1, a front bumper 7 is arranged with a sensor 8 capable of detecting or predicting a collision with a pedestrian, and is constructed by a constitution of operating a gas generator 34 (refer to FIGS. 10A and 10B) constituting a drive source of the actuator 21 of the lift-up apparatus when an operating circuit, not illustrated, inputted with a signal from the sensor 8 detects or predicts the collision of the vehicle V and the pedestrian based on the signal from the sensor 8.

Figure 3:
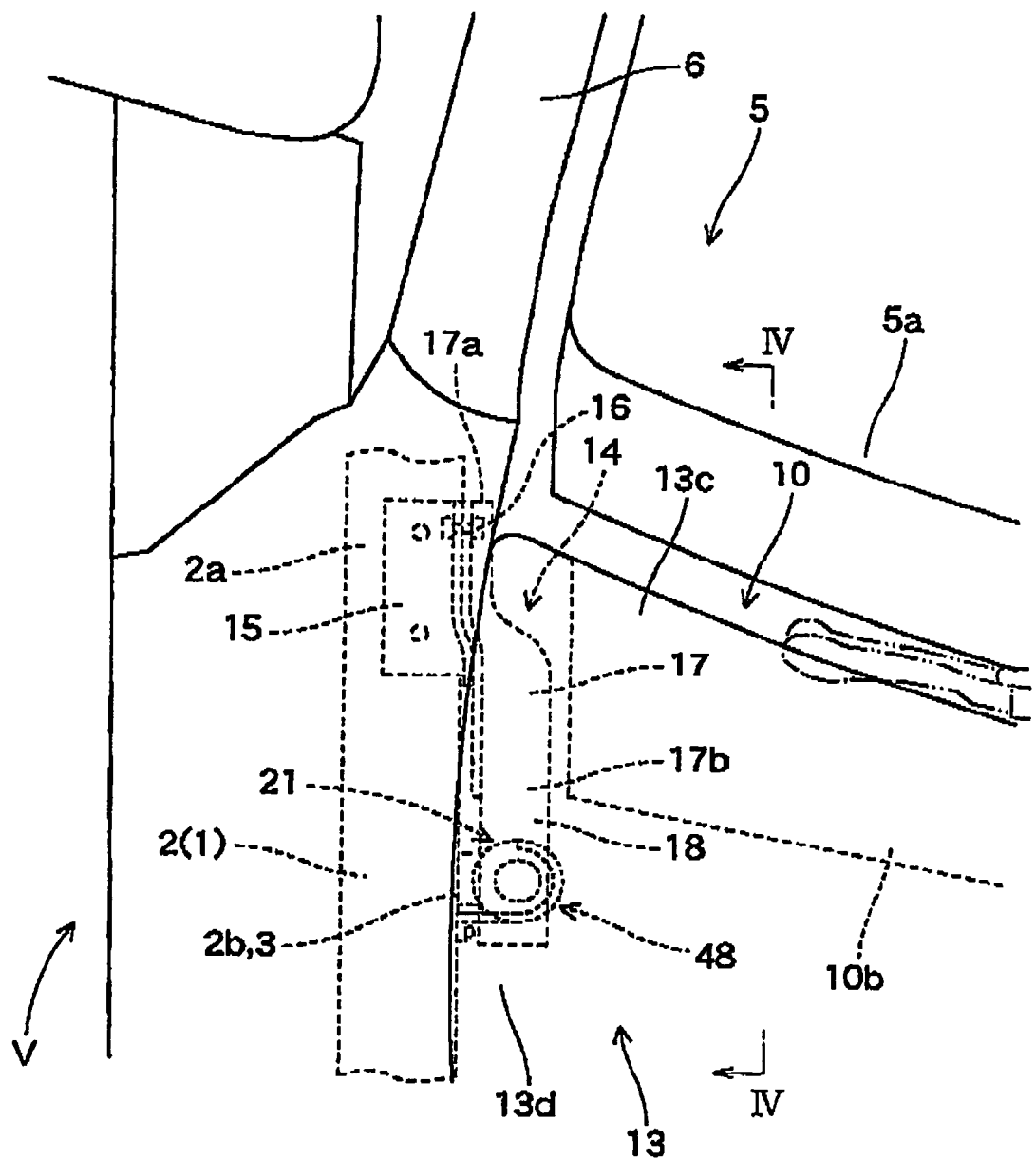
FIG. 3 is a partially enlarged plane view of the vehicle mounted with the hood lift-up apparatus of the embodiment.
Figure 4:
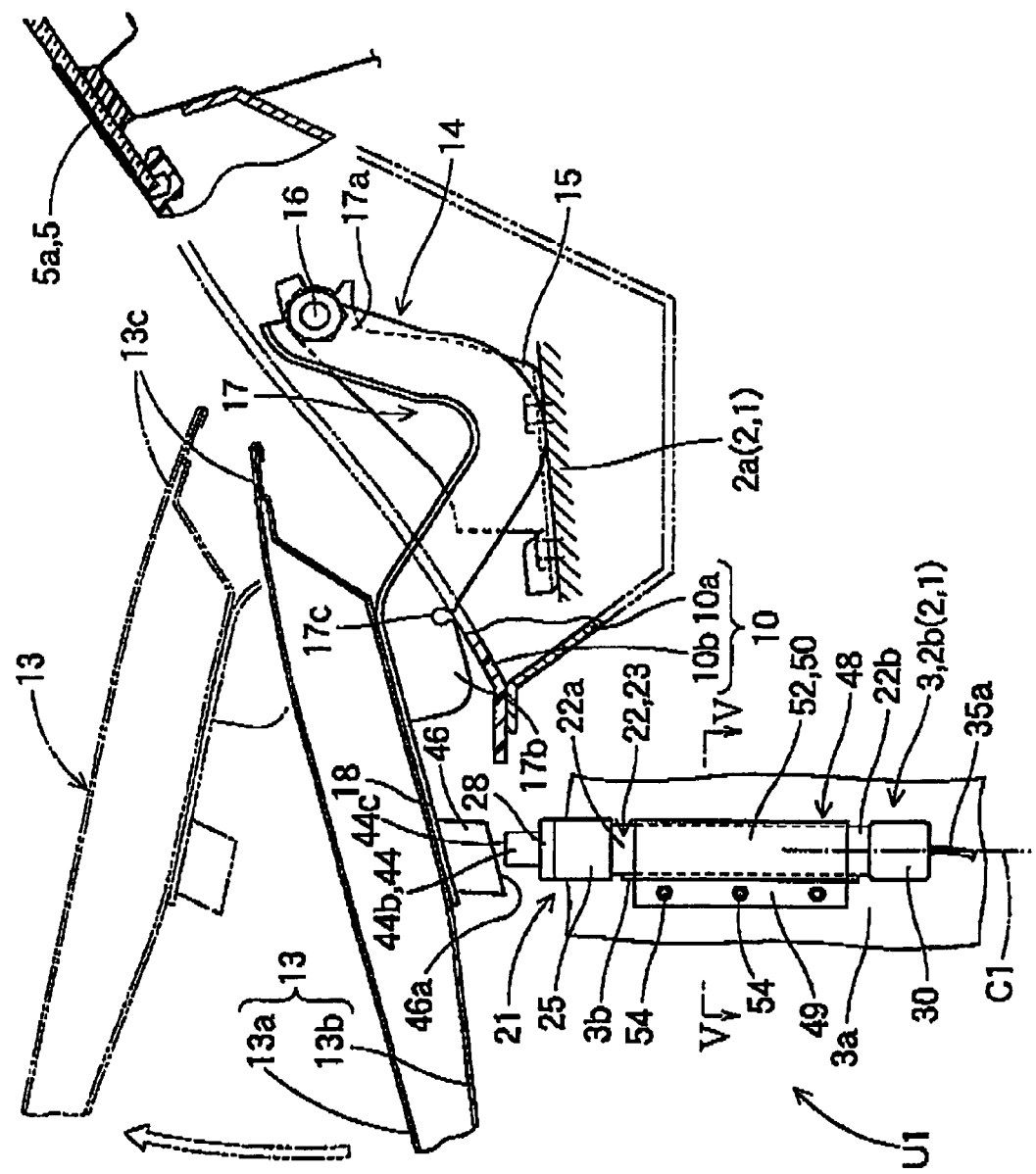
FIG. 4 is an outline vertical sectional view along a front and rear direction showing the hood lift-up apparatus of the embodiment and a hinge portion of the vehicle in correspondence with a portion IV-IV of FIG. 3.
Figure 8:
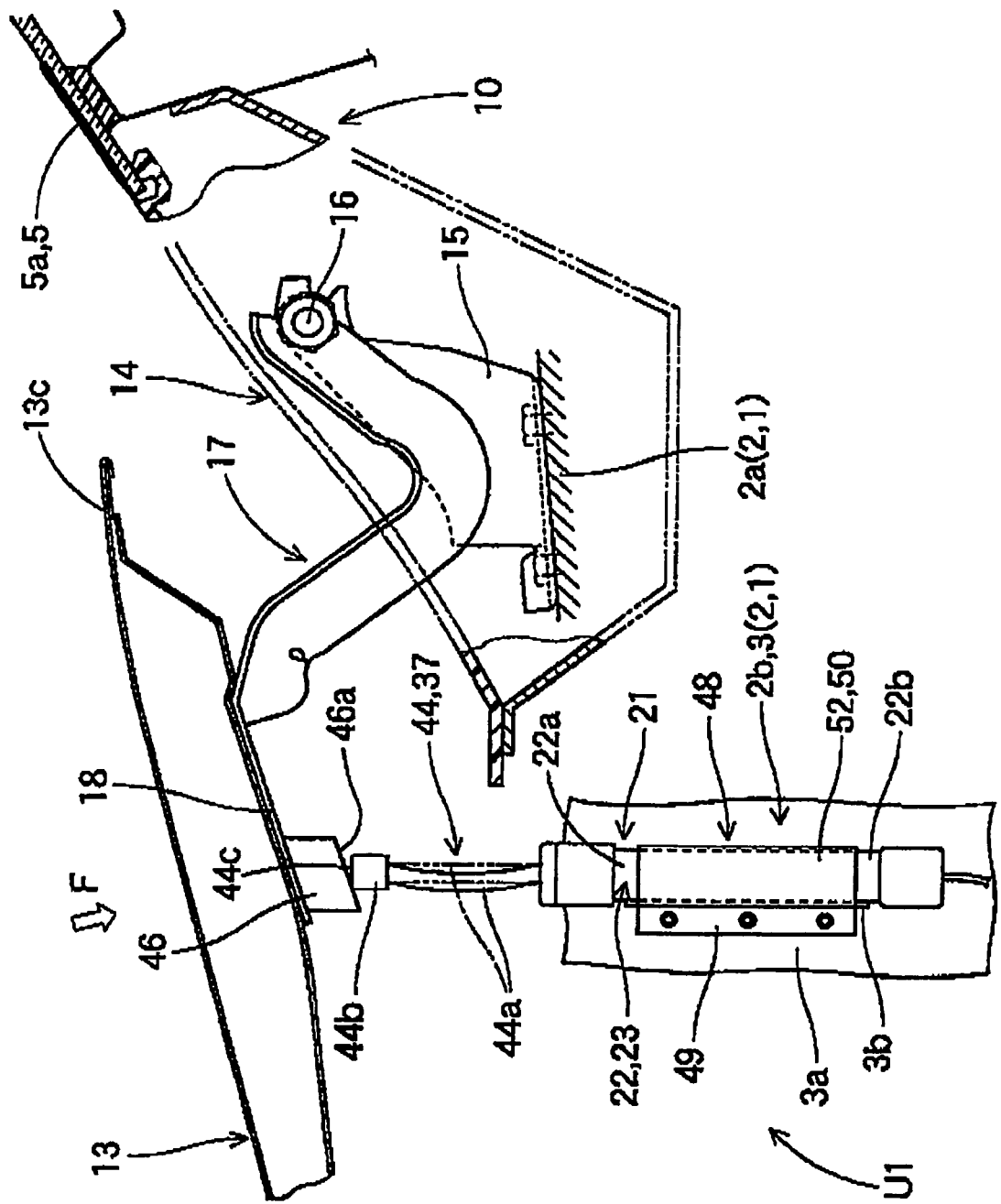
FIG. 8 is an outline view showing a state of plastically deforming a support rod of the actuator in the hood lift-up apparatus of the embodiment.

As shown by FIGS. 1, 3, the hood panel 3 is arranged to cover an upper side of an engine room ER of the vehicle V, and is connected to a side of the body 1 of the vehicle V to be able to open and close in front opening by hinge portions 14 arranged at a vicinity of the rear end 13c on sides of both edges in a left and right direction. The hood panel 13 is made by a sheet metal constituted by aluminum (aluminum alloy) or the like and is constituted by an outer panel 13a on an upper face side, and an inner panel 13b disposed on a lower face side and increasing a strength more than the outer panel 13a as shown by FIG. 4. The hood panel 13 is constituted to be able to be plastically deformed to be able to absorb a kinetic energy of the pedestrian when the pedestrian is received. Further, according to the embodiment, in the collision of the vehicle V and the pedestrian, the actuator 21 is operated to push up the rear end 13c of the hood panel 13 to the upper side by operating the actuator 21, a deformation space can be formed between the rear end 13c of the hood panel 13 and the engine room ER, and therefore, a plastic deformation amount in the plastic deformation can be increased. Further, in the case of the embodiment, when a shaft portion 44a of a support rod 44 mentioned later of the piston rod 37 which has moved up the rear end 13c of the hood panel 13 receives the pedestrian moving from the upper side in a skewed rear lower direction, in accordance with downward movement of the hood panel 13, a head portion 44b on an upper side is bent to plastically deform to direct to a rear side (refer to FIGS. 8, 9). Therefore, in the case of the embodiment, even when the kinetic energy of the pedestrian is large, much of the kinetic energy of the pedestrian can be absorbed by plastic deformation of the hood panel 13 per se and bending plastic deformation of the shaft portion 44a of the piston rode 37.

The hinge portions 14 are arranged at a left edge 13d and a right edge 13e on a side of the rear end 13c of the hood panel 13 (refer to FIGS. 1 through 3), and respectively constituted by including hinge bases 15 fixed to the attaching flanges 2a connected to hood ridge reinforces 2a on a side of the body 1, and hinge arms 17 fixed to a side of the hood panel 13 (refer to FIG. 4). As shown by FIG. 4, each of the hinge arms 17 is constituted by a shape of being bent substantially in a semicircular arc shape to project an angle member made by a sheet metal in a lower direction, and a root portion end 17a on a side of the hinge base 15 is pivotably connected to the hinge base 15 by utilizing a support shaft 16. Further, each of the hinge arms 17 is constructed by a constitution of including a connecting plate portion 18 extending from a front end 16b substantially in line with a lower face of the hood panel 13, and the connecting plate portion 18 is coupled to the lower face side of the rear end 13c of the hood panel by utilizing welding or the like. Further, a vicinity of the front end 17b of the hinge arm 17c is formed with a notched recess portion 17c constituted to notch a lower edge substantially in a circular shape, and a portion at a surrounding of the notched recess portion 17c is made to constitute a plastic deformation portion 17d of being plastically deformed when the piston rod 37 pushes up the rear end 13c of the hood panel 13 in operating the actuator 21 to permit to move up the hood panel 13 (refer to FIG. 7).

The respective shafts 16 are arranged to make axial directions thereof in line with the left and right direction of the vehicle V. Further, when the hood panel 13 is opened, as shown by a bold line through a two-dotted chain line of FIG. 4, the hood panel 13 can be opened in front opening when a side of a front end 13f (refer to FIG. 1) of the hood panel 13 is moved up in front opening along with a side of the front end 17b of each of the hinge arms 17. Incidentally, when the rear end 13c of the hood panel 13 is moved up, a side of the front end 13f of the hood panel 13 is not detached from a side of the body 1 by a latch mechanism 20 (refer to FIG. 2) of locking a hood lock striker 19 normally arranged on the side of the front end 13f in being closed.

As shown by FIGS. 3, 4, a rear side of the hood panel 13 is arranged with a cowl 10 constituted by a cowl panel 10a having a high rigidity on a side of the body 1, and a cowl bar 10b made by a synthetic resin on an upper side of the cowl panel 10a. The cowl bar 10b is arranged such that a rear end side thereof is made to be continuous to a side of a lower portion 5a of a front windshield 5. Further, left and right sides of the front windshield 5 are arranged with front pillars 6, 6, as shown by FIGS. 1 through 3.

As shown by FIGS. 1 through 3, the lift-up apparatus U are arranged at vicinities of the left and right hinge portions 14 of the hood panel 13 and are constituted by including the actuators 21 arranged on the lower side of the rear end 13c of the hood panel 13, and receiving seats 46 arranged on the side of the hood panel 13 on upper sides of the actuators 21 in correspondence with the respective actuators 21, and attaching brackets 48 of fixing the respective actuators 21 to the hood ridge reinforces 2 constituting the body members.

Figure 10A:
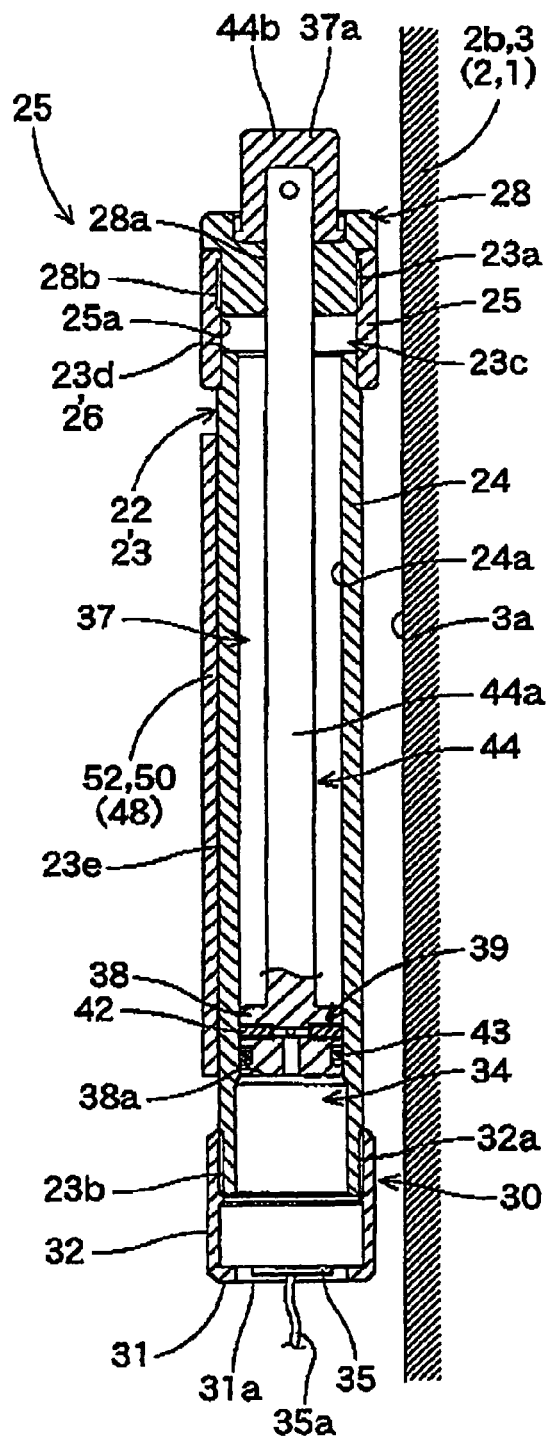
FIGS. 10A and 10B illustrate outline vertical sectional views of the actuator of the hood lift-up apparatus of the embodiment, showing an occasion before being operated and an occasion of being finished to operate.
Figure 10B:
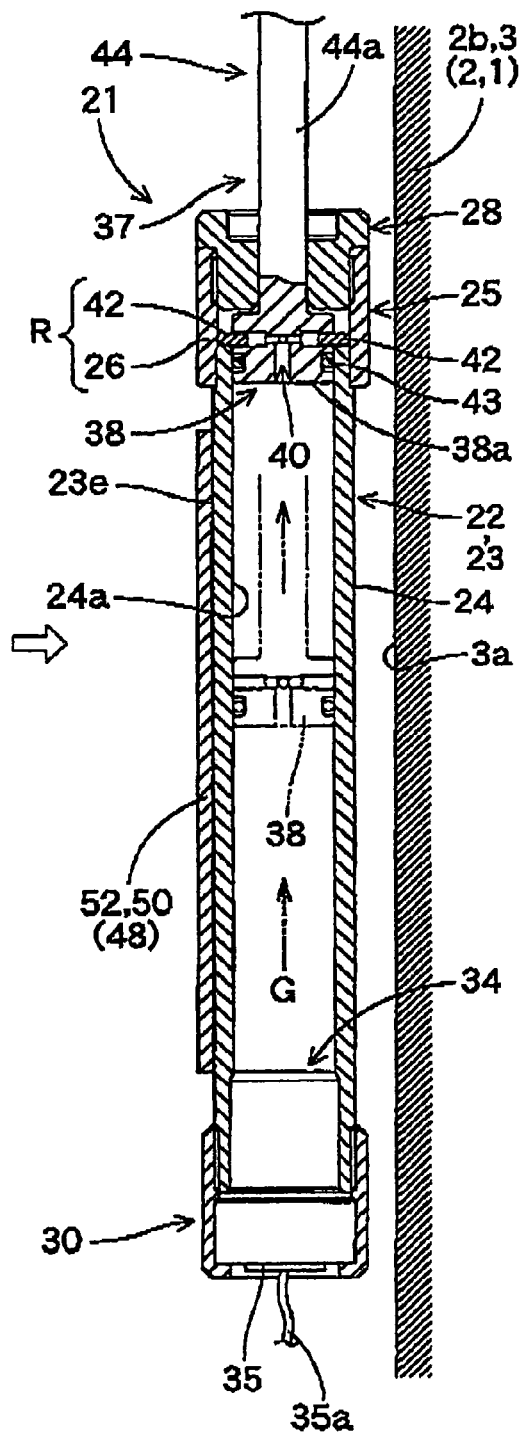

As shown by FIGS. 1, 2, 4, the actuators 21 of the embodiment are arranged on lower sides of the respective hinge portions 14 constituting lower side of the left edge 13d and the right edge 13a on the side of the rear end 13c of the hood panel 13. As shown by FIGS. 10A and 10B, each of the actuators 21 is constituted by including a cylinder 22 in a shape of a circular cylinder arranged by making an axial direction thereof substantially in line with a vertical direction (up and down direction), the gas generator 34 for making a gas constituting a working fluid flow into the cylinder 22, the piston rod 37 arranged to project from the cylinder 22 to the upper side, and a lock mechanism R of restricting a downward movement of the piston rod 37 after an upward movement. The lock mechanism R is constituted by a lock pin 42 at inside of the piston 38 mentioned later of the piston rod 37, and a locking face 26 formed on a side of the cylinder 22 to lock a lower face side of the lock pin 42 projected after the upward movement of the piston 38.

As shown by FIGS. 10A and 10B, the cylinder 22 is constituted by including a main body 23 in a shape of a circular cylinder arranged by making an axial direction thereof substantially in line with the vertical direction (up and down direction), and caps 28, 30 respectively fixed to upper and lower ends of the main body 23. The main body 23 is constructed by a constitution of including a sliding portion 24 of sliding the piston 38 of the piston rod 37 in an upward movement, and including a recess portion 13c recessed over an entire periphery in a peripheral direction at an inner peripheral face on an upper end side of the main body 23 constituting an upper side of the sliding portion 24. The recess portion 23c is formed at a position of projecting the lock pin 42 after the upward movement of the piston 38, in the case of the embodiment, a portion of the recess portion 23c is arranged on an upper side of the sliding portion 24, and is constituted by a large diameter portion 25 an inner diameter dimension of which is made to be larger than an inner diameter dimension of the sliding portion 24. In the case of the embodiment, the large diameter portion 25 is constituted by a separate member an inner diameter dimension of which is made to be larger than that of a member constituting the sliding portion 24 and which is integrated to the member constituting the sliding portion 24 by welding or the like. Further, a stepped difference face from the sliding portion 24 of the large diameter portion 25, in other words, a lower face 23d of the recess portion 23c is made to constitute the locking face 26 of restricting the downward movement of the piston 38 (piston rod 37) by locking a side of a lower portion of the projected lock pin 42 (side in downward movement direction (refer to FIGS. 10A to 11B).

The cap 28 arranged on the upper side of the main body 23 is constituted substantially by a shape of a circular pillar and includes an inserting hole 28 of inserting the shaft portion 44a of the support rod 44 mentioned later of the piston rod 37 at a center thereof, and includes a male screw 28b for screwing a female screw 23a provided at an inner peripheral side of the upper end of the main body 23 of the cylinder 22 (inner peripheral side of the large diameter portion 25). The cap 28 is attached to the main body 23 by screwing the male screw 28b to the female screw 23a in a state of inserting the shaft portion 44a of the support rod 44 to the inserting hole 28a.

The cap 30 arranged on the lower end side of the main body 23 is constituted by including a root portion end wall portion 31 substantially in a shape of a circular plate arranged to close a lower end side of the main body 23, and a peripheral wall portion 32 substantially in a shape of a circular cylinder extended from an outer peripheral edge of the root portion end wall portion 31 to an upper side. The root portion end wall portion 31 is formed with an inserting hole 31a capable of inserting a connector 35 mentioned later of the gas generator 34. The peripheral wall portion 32 is arranged with a female screw 32a of screwing to the male screw 23b provided on an outer peripheral side of a lower end of the main body 23 of the cylinder 22. The cap 30 is attached to the main body 23 by screwing the female screw 32a to the male screw 23b in a state of attaching the gas generator 34 to the root portion end wall portion 31 by utilizing a portion of a peripheral edge of the inserting hole 31 of the root portion end wall portion 31 and a portion on a side of a lower portion of the peripheral wall portion 32.

As the gas generator 34, a micro gas generator is used, the lower end face of the gas generator 34 is arranged with the connector 35 wired with a lead wire 35a of inputting an electric signal from a control circuit, not illustrated (refer to FIGS. 10A and 10B). The gas generator 34 generates a combustion gas by combusting a powder including therein when the electric signal from the control circuit, not illustrated, is inputted, and supplies the gas (combustion gas) G to a side of the lower face 38b of the piston 38 at inside of the cylinder 22.

The piston rod 37 is constituted by the piston 38 slidably contained at inside of the cylinder 22, the support rod 44 connected to the piston 38.

The piston 38 is constituted by a shape of substantially a circular pillar having an outer diameter dimension slidable with the sliding portion 14 of the cylinder 22, and contains the lock pin 42 constituting the lock mechanism R. As shown by FIGS. 12A and 12B, the lock pins 42 are arranged at 4 portions constituting a radial shape centering on a center axis of the piston 38, and are respectively contained at inside of containing recess portions 39 formed at the piston 38. The respective lock pins 42 are constituted by a shape of substantially a circular pillar arranged such that axial directions thereof are in line with directions orthogonal to an axis of the piston 38 (horizontal direction). As shown by FIGS. 11A to 12B, the piston 38 is formed with a flow in path portion 40a of making the gas G flow into the containing recess portion 39 of containing the lock pin 42. In the case of the embodiment, as shown by FIGS. 11A to 12B, the flow in path portion 40 is constituted by a vertical flow path portion 40a formed to extend from a center on a side of the lower face 38a of the piston 38 in an upper direction and constituted to open a lower end side thereof, and horizontal flow path portions 40b extended in four directions to be directed to sides of the respective containing recess portions 39 from an upper end of the vertical flow path portion 40a. Further, when the gas G flowing into the side of the lower face 38a of the piston 38 at inside of the cylinder 22 flows to inside of the containing recess portion 39 of containing the lock pin 42 by way of the flow in path portion 40, the respective lock pins 42 are projected along directions orthogonal to the axis of the piston 38 to be directed to an outer peripheral side of the piston 38 (refer to FIG. 11B and FIG. 12B).

Figure 11A:
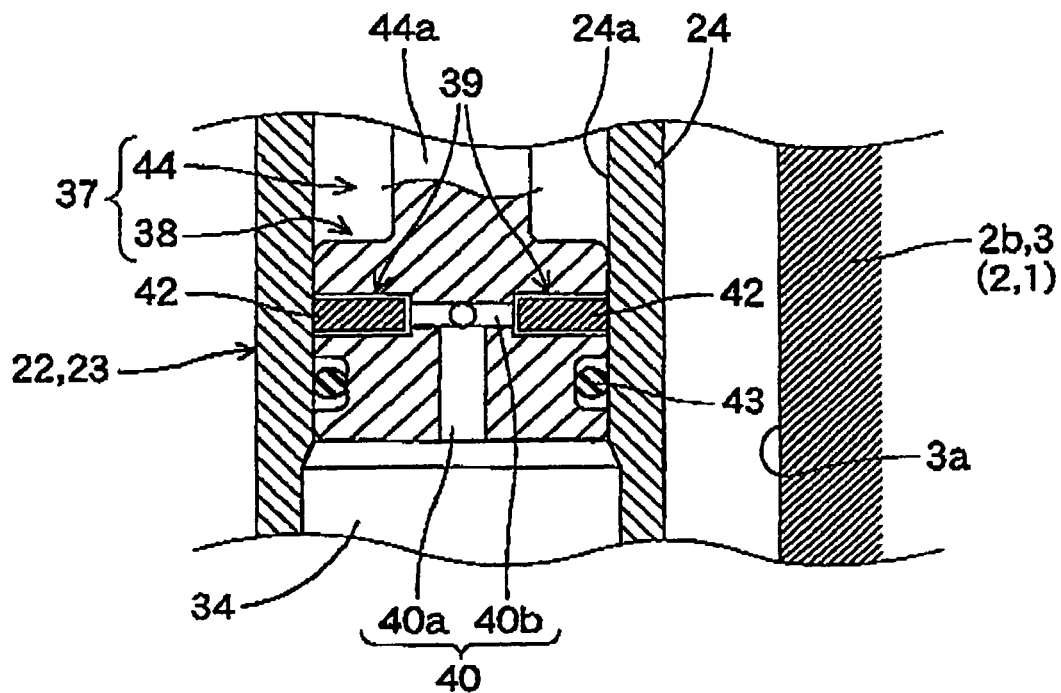
FIGS. 11A and 11B illustrate outline enlarged vertical sectional views showing a portion of a lock mechanism in the actuator of the hood lift-up apparatus of the embodiment, showing an occasion before being operated and an occasion of being finished to operate.
Figure 11B:
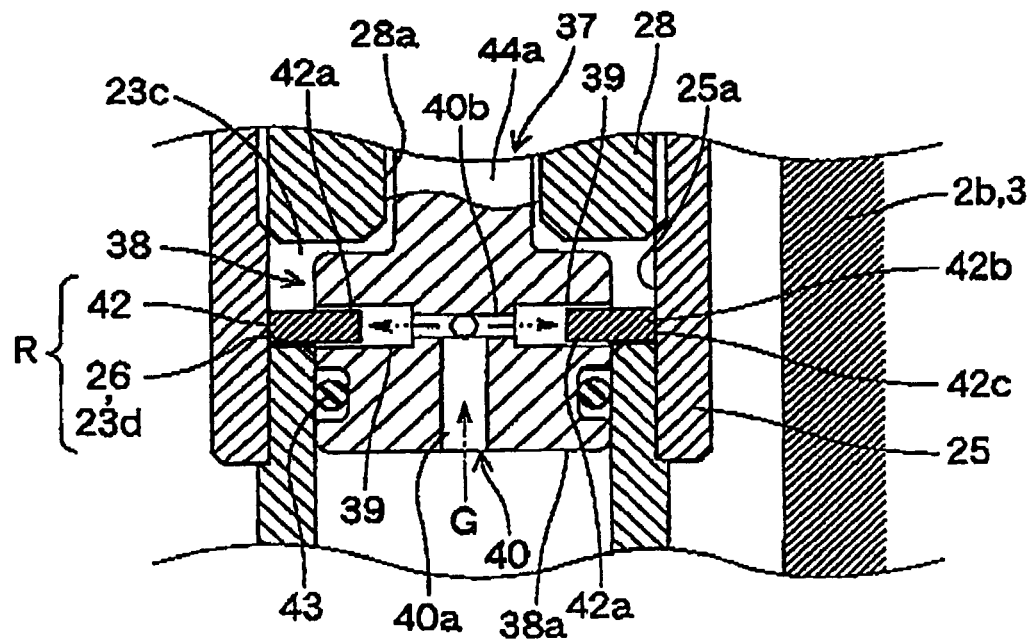
Figure 12A:
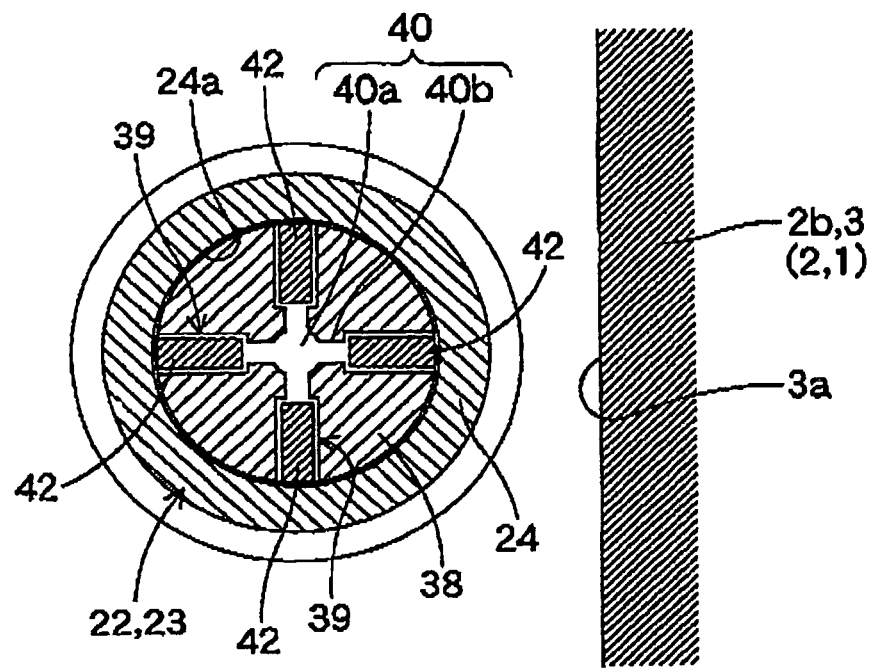
FIGS. 12A and 12B illustrate outline enlarged cross-sectional views showing the portion of the lock mechanism in the actuator of the hood lift-up apparatus of the embodiment, showing the occasion before being operated and the occasion of being finished to operate.
Figure 12B:
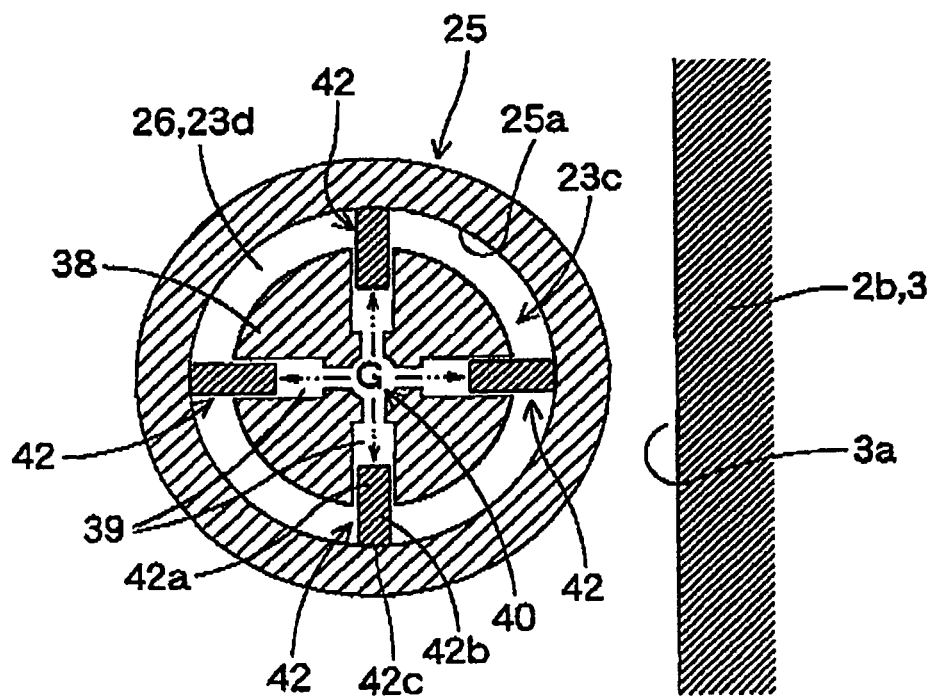

In the case of the embodiment, when the piston 38 is arranged at a portion of the large diameter portion 25 by being moved up, the lock pin 42 is projected in the direction orthogonal to the axis of the piston 38 from the containing recess portion 39 to be directed to the outer peripheral side of the piston 38 instantaneously by receiving a pressure of the gas G flowing into the containing recess portion 39 by way of the flow in path portion 40 (refer to FIG. 11B and FIG. 12B). At this occasion, the lock pin 42 brings a front end face 42c thereof into contact with an inner peripheral face 25a of the large diameter portion 25 in a state of containing a side of the root portion 42a at inside of the containing recess portion 39. That is, the lock pin 42 is arranged to ride over between the locking face 26 and the containing recess portion 39, a lower face of the front end portion 42b in a state of bringing the front end face 42c into contact with the inner peripheral face 24b of the large diameter portion 25 is locked by the locking face 26 to restrict the downward movement of the piston 38.

Further, in the case of the embodiment, an outer peripheral face of a portion at a vicinity of a lower end constituting a lower side of the containing recess portion 39 (lock pin 42) of the piston 38 is arranged with an O ring 43 for preventing leakage of the gas from between the sliding portion 24 and the piston 38 (refer to FIGS. 10A to 11B).

Figure 9:
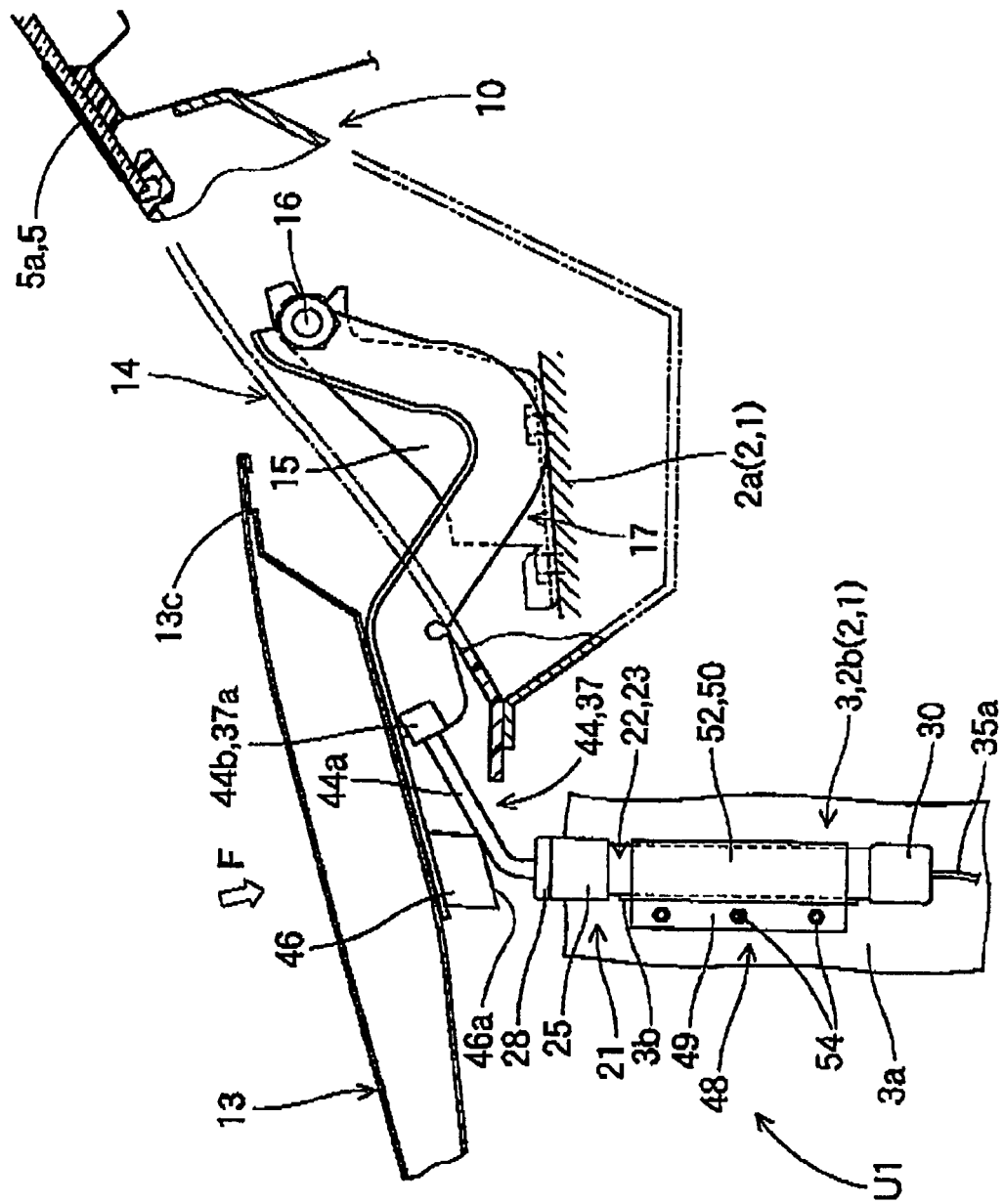
FIG. 9 is an outline view showing the state of plastically deforming the support rod of the actuator in the hood lift-up apparatus of the embodiment and is a view showing a state of deforming the support rod more than in FIG. 8.

The support rod 44 includes a shaft portion 44a in shape of a round bar arranged along an axial direction (up and down direction) of the cylinder 22, and a head portion 44b substantially in a shape of circular pillar which is arranged on an upper end side of the shaft portion 44a and an outer diameter dimension of which is made to be larger than that of the shaft portion 44a. The head portion 44b is brought into contact with a lower face 46a of the receiving seat 46 provided on a side of the hood panel 13 to push up the rear end 13c of the hood panel 13 to an upper side. In the case of the embodiment, the head portion 44b is constructed by a constitution substantially orthogonal to an axial direction of the shaft portion 44a (axial direction of the cylinder 22) to incline an upper face 44c brought into contact with the lower face 46a to the receiving seat 46 relative to the lower face 46a of the receiving seat 46. Further, the support rod 44 is constituted by a metal member of steel or the like to be able to bend to plastically deform the portion of the shaft portion 44a, in the case of the embodiment, it is integrally constituted with the piston 38. According to the embodiment, when the rear end 13c of the hood panel 13 is moved downward by receiving the pedestrian moving in the skewed rear lower direction, as shown by FIG. 9, the shaft portion 44a of the support rod 44 is bent to plastically deform to direct the head portion 44b to the rear side by receiving the kinetic energy F of the pedestrian.

The receiving seat 46 is attached to a portion of a connecting plate portion 18 provided on a side of a front end 17b of a hinge arm 17 arranged at a lower face of the rear end 13c of the hood panel 13. The receiving seat 46 is constituted to be able to receive the head portion 44b of the support rod 44 provided at an upper end 37a of the piston rod 37 which is moving up of the actuator 21 by a portion thereof on a side of the lower face 46a. Further, the receiving seat 46 is constituted to be inclined relative to a horizontal direction such that the lower face 46a is made to be substantially in line with a lower face of an inner panel 13b of the hood panel 13 and the front side is made to be disposed on a lower side of the rear side. Specifically, the lower face 46a of the receiving seat 46 is constituted such that in operating the actuator 21, that is, in a state of moving up the rear end 13c of the hood panel 13, an angle θ (refer to FIG. 7) between the lower face 46a and the cylinder 22 (support rod 44) is set to be within a range of 95 through 140°. Because when the angle θ is less than 95°, the kinetic energy F of the pedestrian moving in the skewed rear lower direction is operated substantially along the axial direction of the support rod 44, and therefore, there is a concern of buckling the support rod 44, conversely, when the angle θ exceeds 140°, a friction force operated between the front end of the head portion 44b of the support rod 44 and the lower face 46a is small, and there is a concern of moving the head portion 44b of the support rod 44 to slide relative to the lower face 46a. Further, according to the lift-up apparatus U1 of the embodiment, the upper face 44c of the head portion 44b of the support rod 44 is constituted to be inclined to the lower face 46a of the receiving seat 46, and therefore, the head portion 44b of the support rod 44 is easy to slide relative to the receiving seat 46, even when the angle θ is small, in the downward movement of the hood panel 13, it can be prevented as less as possible to receive the press force for buckling the support rod 44.

Figure 5:
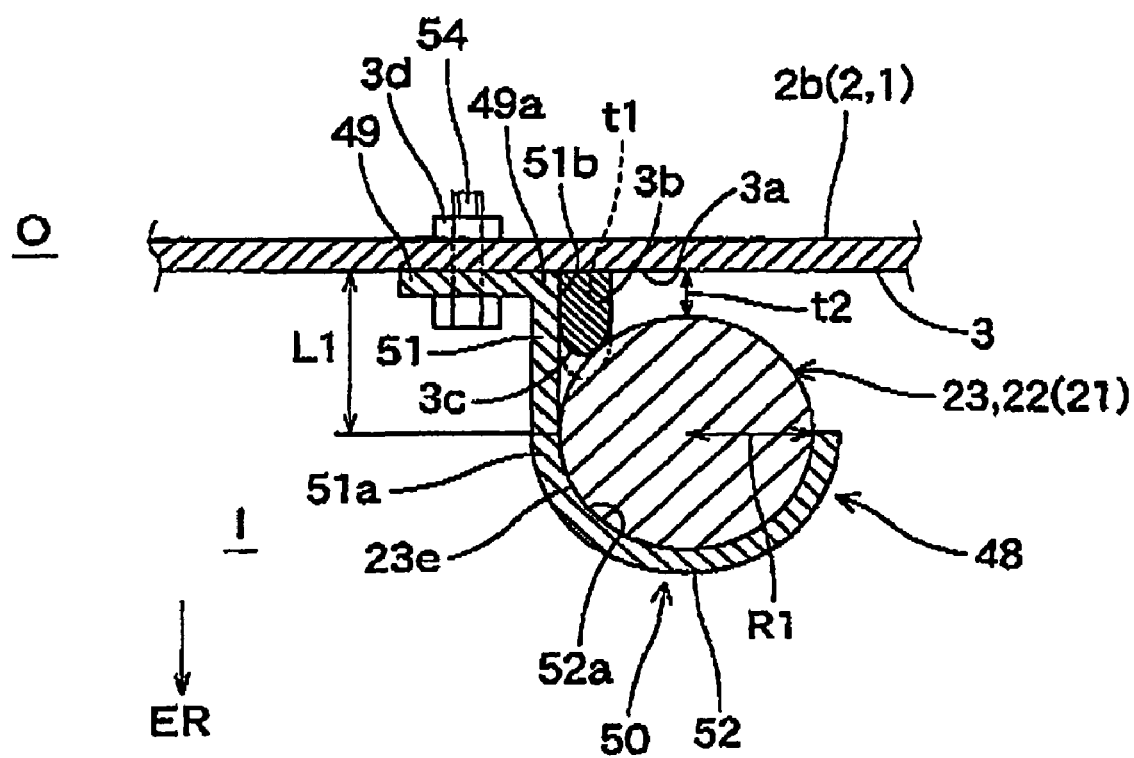
FIG. 5 is an outline sectional view showing an attaching bracket of the hood lift-up apparatus of the embodiment, and is a cross-sectional view along the front and rear direction in correspondence with a portion V-V of FIG. 4.
Figure 6:
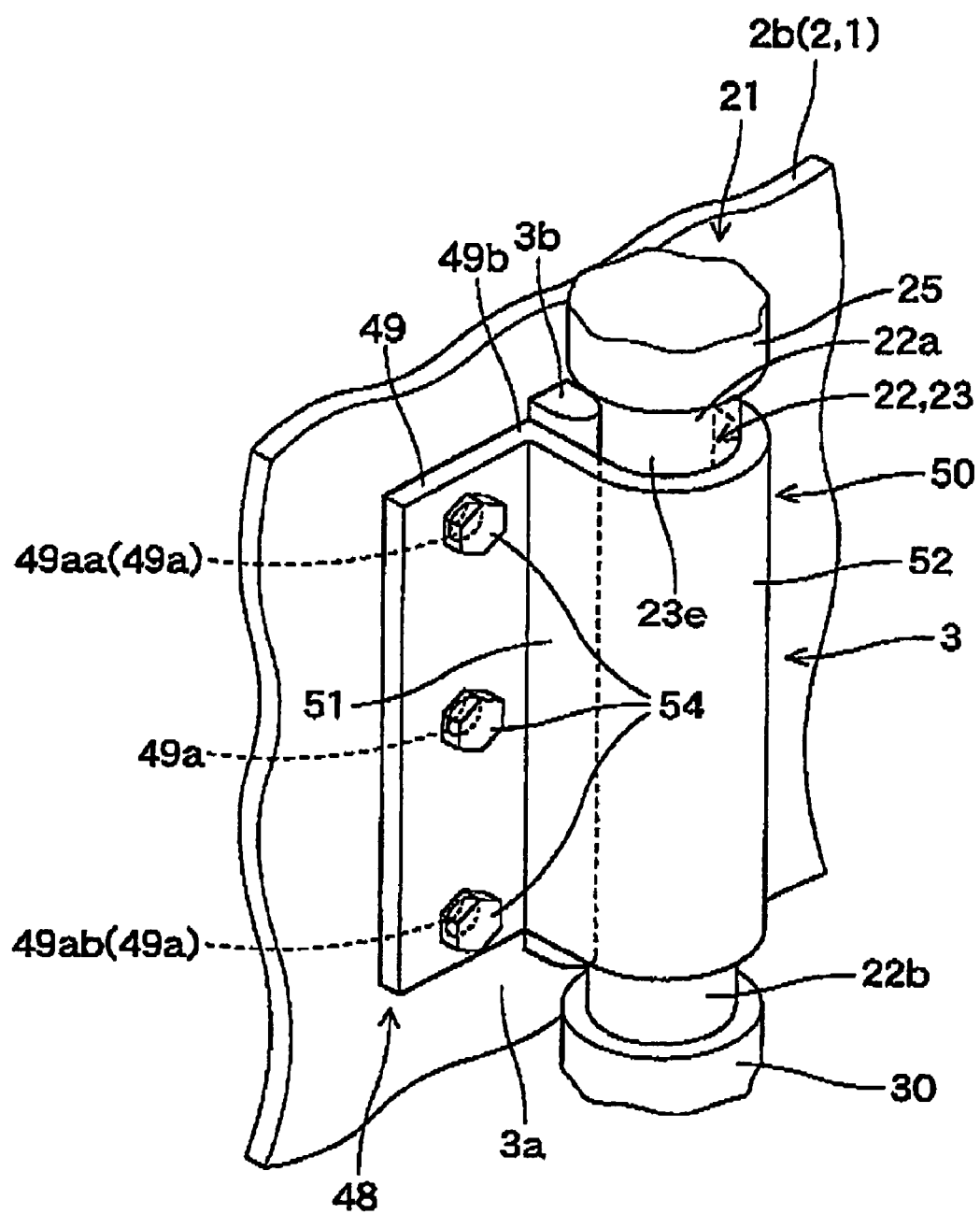
FIG. 6 is a partially enlarged outline perspective view showing a cylinder of an actuator and the attaching bracket of the hood lift-up apparatus of the embodiment.

The attaching bracket 48 for fixing the actuator 21 to the side of the body 1 fixes the actuator 21 to the attaching seat 3 provided at a hood ridge reinforce 2 constituting the body member. As shown by FIGS. 2, 3, the hood ridge reinforces 2 are constituted by a sheet metal material substantially in a shape of a quadrangular cylinder arranged along the front and rear direction on both left and right sides of an engine room ER, and a wall portion 2b on a side of the engine room ER constitutes the attaching seat 3. Further, the attaching seat 8 includes the attaching face 3a along substantially the front and rear direction and along substantially the vertical direction. The attaching face 3a is constituted by a surface of the wall portion 2b. As shown by FIGS. 5, 6, a position of the attaching seat 3 constituting a front face side of the cylinder 22 is formed with a projected portion 3b projected to a side of the cylinder 22 (side of engine room ER) from the attaching face 3a. As shown by FIG. 6, the projected portion 3b is formed to be continuously arranged substantially over an entire region in the up and down direction of a main body 23 of the cylinder 22 along an axial direction (vertical direction) of the cylinder 22, and is constituted to fill a gap t1 (refer to FIG. 5) formed between a base plate portion 51 of a holding portion 50 mentioned later of the attaching bracket 48, and the main body 23 of the cylinder 22 when the attaching bracket 48 is attached to the attaching seat 3. According to the embodiment, the projected portion 3b is formed to be projected from upper and lower edges of the attaching bracket 48 to an upper side or a lower side by making a length dimension in the up and down direction larger than a width direction in the up and down direction of the attaching bracket 48 (refer to FIGS. 4, 6). In the case of the embodiment, the projected portion 3b is formed on the attaching face 3a by welding or the like. Further in details, the projected portion 3b is constituted to be brought into press contact with an outer peripheral face 23e of the main body 23 and a rear face 51b of the base plate portion 51 when the attaching portion 49 is fastened to the attaching seat 3 by a bolt S4 by making a sectional area thereof more or less larger than that of a space from the attaching face 3a over to a front face side of the main body 23 of the cylinder 22 when the attaching portion 49 of the attaching bracket 48 fixedly attached with the cylinder 22 is brought into contact with the attaching face 3a.

As shown by FIGS. 4, 5, the attaching bracket 48 is constituted by making a width dimension in the up and down direction more or less smaller than a width dimension in the up and down direction of the main body 23 to be able to hold the side of the outer peripheral face of the main body 23 of the cylinder 23 substantially over an entire region in the up and down direction. The attaching bracket 48 includes the holding portion 50 disposed on a rear portion side constituting the side of the cylinder 22 for holding the cylinder 22 and the attaching portion 49 extended from the holding portion 50 to the front side to be arranged on the front side of the cylinder 22 and fixed to the attaching seat 3 made of a sheet metal. In the case of the embodiment, the holding portion 50 and the attaching portion 49 are constituted by making width dimensions in the up and down direction coincide with each other.

The attaching portion 49 is constituted by substantially a shape of a plate formed to be along substantially the front and rear direction and along substantially the vertical direction to be in line with the attaching face 3a, and constituted to be arranged with 3 pieces of the attaching holes 49a of penetrating bolts 54 as the attaching means substantially in the up and down direction, and is constituted to be fixed to the attaching seat 3 by penetrating the bolts 54 through the respective attaching holes 49a and fastening nuts 3d fixedly attached to the attaching seat 3.

In the case of the embodiment, the holding portion 50 is constituted by bending a front end side to constitute substantially a J-like shape in a section thereof by extending a rear end 49b constituting an end portion of the attaching portion 49 on a side of the cylinder 22 to be remote from the attaching portion 49. Specifically, the holding portion is constituted to include the base plate portion 51 in a shape of a flat plate (rectangular plate shape) projected from the rear end 49b of the attaching portion 49 to the side of the engine room ER (vehicle inner side I) to be substantially orthogonal to the attaching portion 49, and a bent plate portion (bent portion) 52 extended from the front end 51a of the base plate portion 51 to a rear side substantially in a shape of a semicircular arc in a section thereof. The bent plate portion 52 is constituted to hold the main body 23 of the cylinder 22 by fixedly attaching a side of an inner peripheral face 52a to the outer peripheral face 23e of the main body 23 by utilizing welding or the like by constituting a shape of a semicircular arc by making an inner diameter dimension thereof substantially the same as an outer diameter dimension of the main body 23 of the cylinder 22. In the case of the embodiment, as shown by FIG. 6, the bent plate portion 52 is constituted to cover a half of the outer peripheral face 23e of the main body 23 on the vehicle inner side I (vehicle inner side I), in other words, to cover the outer peripheral face 23e of the main body 23 substantially over a half periphery from a rear face side to a front face side in the vehicle inner side I. Further, the bent plate portion 52 is constituted by making the width dimension in the up and down direction the same as the width dimension in the up and down direction of the attaching portion 49, in other words, by making the width dimension in the up and down direction larger than that of the region of arranging the attaching hole 49a of the attaching portion 49, as shown by FIG. 6, constituted to hold the main body 23 of the cylinder 22 by supporting the front face side and the rear face side of the main body 23 of the cylinder 22 substantially over an entire region in the up and down direction including a region on the rear side of the attaching hole 49a on an upper end side and a region on a rear side of the attaching holes 49aa on the upper end side and the region on the rear side of the attaching hole 49ab and the cylinder 22. According to the base plate portion 51, a length dimension (a length dimension from the attaching face 3a in being mounted to the vehicle) L1 in the left and right direction is set to be larger than a radius R1 of the main body 23.

Further, the attaching bracket 48 of the embodiment is provided with the gap t1 (refer to FIG. 5) between the base plate portion 51 on the side of the attaching piece portion 49 of the holding piece portion 50 and the main body 23 in a state of fixedly attaching the outer peripheral face 23e of the main body 23 to the inner peripheral face 52a of the bent plate portion 52, the gap t1 is filled by the projected portion 3b provided at the attaching seat 3 when the attaching piece portion 49 is fastened to the attaching seat 3 by the bolt 54, and the projected portion 3b is brought into contact with the base plate portion 51 and the outer peripheral face 23e of the main body 23. In details, the outer surface 3c of the projected portion 3b is brought into press contact with the outer peripheral face 23e of the main body 23 and the rear face 51b of the base plate portion 51. Further, when the attaching piece portion 49 is fastened to the attaching seat 3 by the bolt 54, a gap t2 is formed between the main body 23 of the cylinder 22 and the attaching face 3a (refer to FIG. 5). Further, in the case of the embodiment, as shown by FIGS. 10A and 10B, the cylinder 22 is fixed to the attaching seat 3 by utilizing the attaching bracket 48 to provide the gap between the cylinder 22 and the attaching face 3a even at the portion of the large diameter portion 25 made to be larger than the main body 23 and the cap 30.

Figure 7:
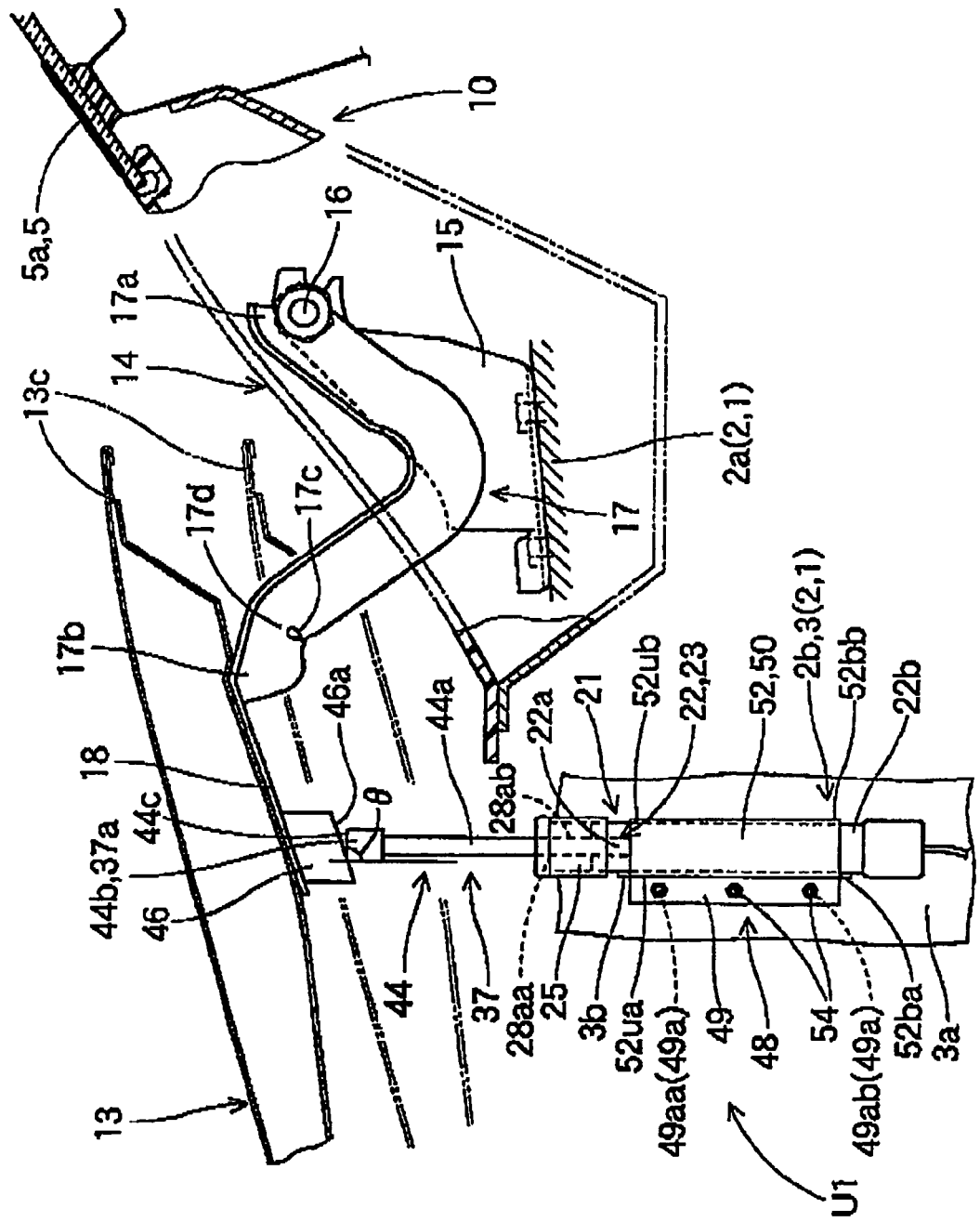
FIG. 7 is an outline sectional view showing an occasion of operating the hood lift-up apparatus of the embodiment.

According to the lift-up apparatus U of the embodiment, when an operating circuit, not illustrated, detects or predicts the collision of the vehicle V and the pedestrian by the signal from the sensor 8, the gas generator 34 of the actuator 21 is operated, as shown by FIGS. 10A and 10B, the generated gas G pushes up the piston 38 at inside of the main body 23 of the cylinder 22, the head portion 44b of the support rod 44 constituting the upper end 37a of the piston rod 37 is brought into contact with the lower face 46a of the receiving seat 46, and the rear end 13c of the hood panel 13 is moved up to widen a gap between the rear end 13c and the cowl 10 on the lower side. Further, when the piston 38 is moved up until the lock pin 42 constituting the lock mechanism R contained in the piston 38 is arranged at a position in correspondence with the locking face 26 provided at the inner peripheral face of the cylinder 22, that is, at the portion of the large diameter portion 25 of the main body 23 of the cylinder 23, the lock pin 42 is instantaneously projected from the containing recess portion 39 and is arranged to ride over between the containing recess portion 39 and the locking face 26 (refer to FIG. 11B and FIG. 12B), and the piston rod 37 is restricted from being moved downward. Thereafter, as shown by FIG. 7, when the rear end 13c of the hood panel 13 receives the pedestrian moving from the upper side in the skewed rear lower direction in a state of supporting the lower face side by the head portion 44b of the support rod 44, by receiving a kinetic energy F of the pedestrian, the rear end 13c of the hood panel 13 is moved downward while being plastically deformed, in accordance with the downward movement of the hood panel 13, the shaft portion 44a of the support rod 44 the head portion 44b of which is brought into contact with the lower face 46a of the receiving seat 46 is bent to be plastically deformed to direct the head portion 44b on the side of the upper end 37a to the rear side while absorbing the kinetic energy F of the pedestrian (refer to FIGS. 8, 9).

Further, according to the lift-up apparatus U1 of the first embodiment, the actuator 21 is constituted to be fixed to the hood ridge reinforce 2 constituting the body member of the vehicle by utilizing the attaching bracket 48, the actuator 21 is fixed to the hood ridge reinforce 2 by utilizing the attaching bracket 48 having the holding portion 50 of holding the main body 23 of the cylinder 22 and the attaching portion 49 arranged on the front side of the main body 23 of the cylinder 22 by being extended from the holding portion 50 to the front side and by utilizing only a portion of the attaching portion 49, and therefore, in comparison with the case of fixing the cylinder by interposing a reinforcing member and fastening the cylinder at a plurality of portions remote from each other in the up and down direction and in the front and rear direction to ride over the cylinder as in the background art, a simple constitution can be constructed. Further, according to the lift-up apparatus U of the first embodiment, the attaching bracket 48 is fixed to the hood ridge reinforce 2 only at a position constituting the front side of the main body 23 of the cylinder 22, and therefore, in comparison with a case of fixing the attaching bracket to the body member at both front and sides of the cylinder as in the background art, operation time in fixing can be reduced and a number of fabricating steps can be reduced.

Therefore, according to the lift-up apparatus U1 of the first embodiment, the apparatus can be fixed to the hood ridge reinforce 2 constituting the body member easily by a simple constitution.

Further, according to the lift-up apparatus U1 of the first embodiment, after operating the actuator 21, when the hood panel 13 moving up the rear end 13c receives the pedestrian, the kinetic energy F of the pedestrian is absorbed by bending to plastically deform the piston rod 37 (the shaft portion 44b of the support rod 44) of bringing the head portion 44b on the side of the upper end 37a to a side of the lower face of the rear end 13c of the hood panel 13 (lower face 46a of the receiving seat 46) to direct the head portion 44b on the side of the upper end 37a to the rear side. At this occasion, according to the lift-up apparatus U1 of the first embodiment, the actuator 21 is fixed to the hood ridge reinforce 2 at the portion of the attaching portion 49 of the attaching bracket 48 arranged on the front side of the cylinder 22 by being extended from the holding portion 50 of holding the main body 23 of the cylinder 22 to the front side, and therefore, when the pedestrian is butted to the rear end 13c to push down the hood panel 13, and a force of pushing down the upper end 37a of the piston rod 37 to be directed in the rear lower direction is operated, the cylinder 22 is operated with only a rotational moment of rotating the side of the upper end 22a to be directed to the rear side by constituting a fulcrum by a portion of the attaching portion 49 constituting the front side of a center axis C1 (refer to FIG. 4) (in details, a center portion in an up and down direction of the attaching portion 49) is operated. In other words, according to the lift-up apparatus U of the embodiment, when the hood panel 13 is pushed down, a rotational moment of rotating the side of the upper end 22a to the front side is not generated in the cylinder 22. Therefore, the cylinder 22 is not moved to rotate to hamper the bending plastic deformation of the piston rod 37 to the rear side but the piston rod 37 can firmly be bent to plastically deform to direct the upper end 37a to the rear side. As a result, according to the lift-up apparatus U1 of the first embodiment, the piston rod 37 can stably be bent to plastically deform to the rear side, and the kinetic energy F of the pedestrian can stably be absorbed. Particularly, according to the lift-up apparatus U1 of the embodiment, the front face side of the main body 23 at the cylinder 22 is supported by the projected portion 3b projected from the attaching seat 3, and therefore, the front face of the main body 23 can solidly be supported, and it can be restrained as less as possible that the cylinder 22 is moved to rotate the side of the upper end 22a to the front side.

Naturally, it can be taken into consideration that the piston rod 37 is constructed by a constitution of absorbing the kinetic energy of the pedestrian by being bent to plastically deform to direct the upper end to the front side, however, when the piston rod 37 is bent to plastically deform to direct the upper end to the front side, the piston rod 37 is arranged to temporarily make the upper end opposed to the direction of moving the pedestrian energy in the plastic deformation, thereafter, the upper end is deformed to be directed to the front side, and therefore, a reaction force against the pedestrian is large, and there is a concern that the pedestrian cannot smoothly be protected. Therefore, it is preferable to bend to plastically deform the piston rod 37 to direct the upper end to the rear side.

Further, according to the lift-up apparatus U1 of the first embodiment, the attaching portion 49 of the attaching bracket 48 includes 3 pieces of the attaching holes 49a of inserting the bolts 54 as the attaching means for fixing to the attaching seat 3 substantially along the up and down direction, and therefore, by the attaching portion 49, the holding portion 50 per se of supporting the main body 23 of the cylinder 22 can be attached to the hood ridge reinforce 2 constituting the body member solidly by restraining rocking in the front and rear direction, further, according to the lift-up apparatus U1 of the first embodiment, the bent plate portion (bent portion) 52 of the holding portion 50 supports the front face side and the rear face side of the main body 23 of the cylinder 22 over substantially an entire region in the up and down direction including the region on the rear side of the attaching hole 49aa on the upper end side and the region on the rear side of the attaching hole 49ab on the rear end side, and holds the main body 23 of the cylinder 22, and therefore, it can firmly be prevented that the sides of the end portions (upper end 22a, lower end 22b) between the up and down direction of the cylinder 22 is rotated along the front and rear direction.

At the initial stage of the bending plastic deformation of the piston rod 37, the portion on the side of the piston 38 of the shaft portion 44a of the support rod 44 which is moved up presses the rear side face 28ab (refer to FIG. 7) of the inserting hole 28a of the cap 28 to the rear side, and therefore, the cylinder 22 is operated with the rotational moment of directing the side of the upper end 22a to the rear side and directing the side of the lower end 22a to the front side, when the bending plastic deformation is progressed, the portion on the side of the piston 38 of the shaft portion 44a of the support rod 44 presses the front face side 28aa (refer to FIG. 7) of the inserting hole 28a of the cap 28 to the front side, and therefore, it is predicted that the cylinder 22 is operated with a rotational moment of directing the side of the upper end 22a to the front side and directing the side of the lower end 22b to the rear side. However, according to the lift-up apparatus U1 of the first embodiment, as shown by FIG. 7, at an initial stage of the bending plastic deformation of the piston rod 37, in the region on the rear side of the attaching hole 49aa on the upper end side, a rear upper edge portion 52ub supports the rear face of the main body 23, and in the region on the rear side of the attaching hole 49ab on the lower end side, a lower edge portion 52ba of the bent portion 52 supports the front face of the main body 23, in a state of progressing the bending plastic deformation, in the region on the rear side of the attaching hole 49aa on the upper end side, the front upper edge portion 52ua of the bent portion 52 supports the front face of the main body 23, in the region on the rear side of the attaching hole 23ab on the rear end side, a rear lower edge portion 52bb of the bent portion 52 supports the rear face of the main body 23, and therefore, the cylinder 22 receives the rotational moment operating during the time period from the initial stage to the final stage of the bending plastic deformation and it can precisely be prevented to rotate to direct the side of the upper end 22a or the side of the lower end 22b to the front side.

Further, according to the lift-up apparatus U1 of the first embodiment, the cylinder 22 of the actuator 21 provides the gap between the cylinder 22 and the attaching face 3a, and is fixed to the attaching seat 3 by bringing only the projected portion 3b into press contact therewith out being brought into contact with the attaching face 3a. In other words, according to the lift-up apparatus U1 of the first embodiment, as shown by FIG. 5, the main body 23 of the cylinder 22 of the actuator 21 is mounted to the vehicle V by constituting a mode such as one point contact for bringing only the projected portion 3b into press contact with the outer peripheral face without being brought into contact with the attaching face 3a, and therefore, in running the vehicle or the like, it can be prevented as less as possible to generate strange sound by rocking the cylinder 22. Naturally, when such a point is not taken into consideration, there may be constructed a constitution of fixing the actuator to the attaching seat by bringing the main body of the cylinder, or the holding portion of the attaching bracket into contact with the attaching face as in a lift-up apparatus U2 of a second embodiment mentioned later.

Figure 13:
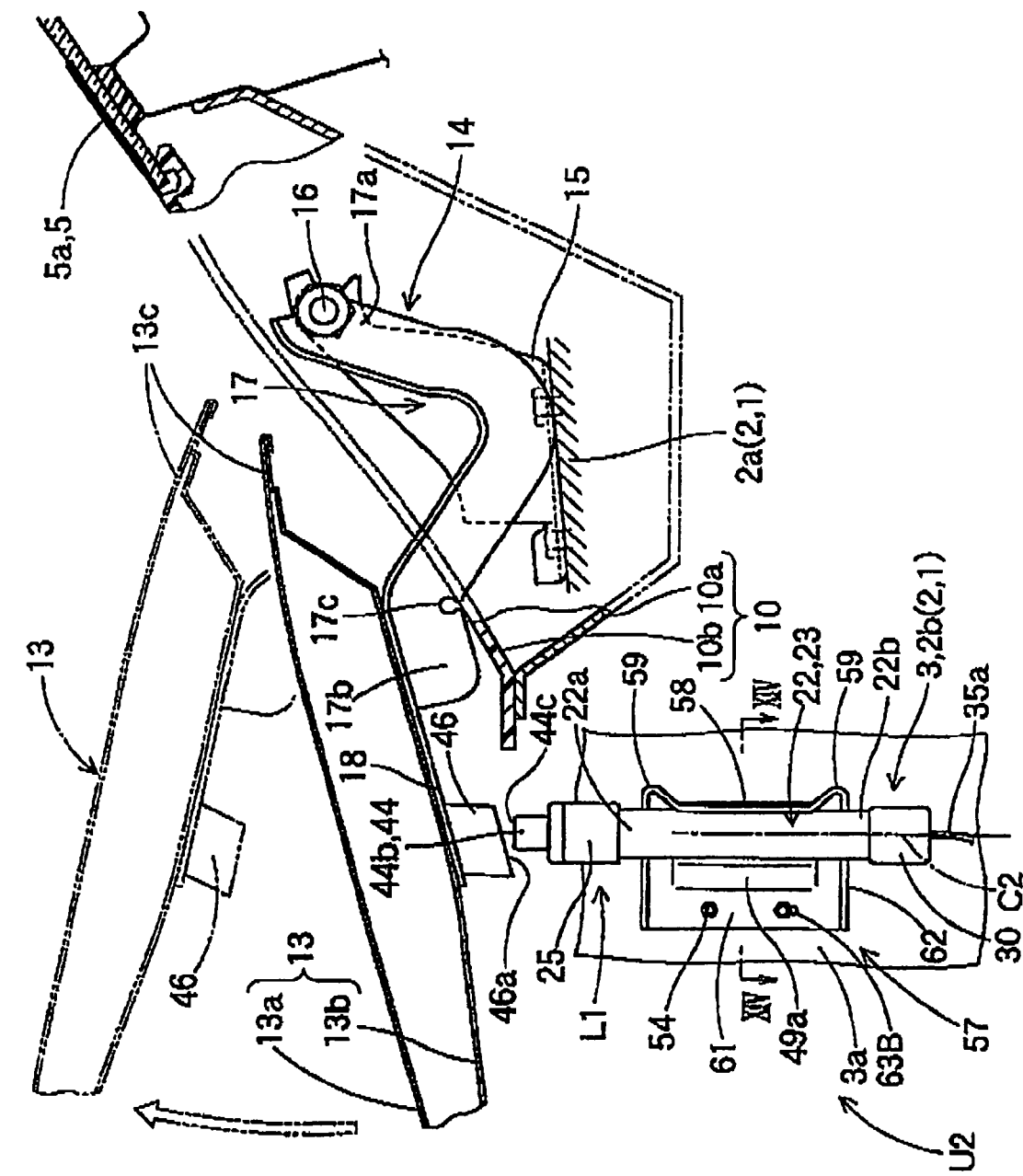
FIG. 13 is an outline vertical sectional view along a front and rear direction showing a hood lift-up apparatus according to a second embodiment of the invention and a hinge portion of a vehicle.

Further, although according to the lift-up apparatus U1 of the first embodiment, the holding portion 50 of the attaching bracket 48 is constituted to cover to hold a vehicle inner side face of the main body 23 of the cylinder 22, the constitution of the attaching bracket is not limited thereto but there may be used an attaching bracket of a constitution including a holding portion of covering to hold a vehicle outer side face of the main body 23 of the cylinder 22 as in an attaching bracket 57 used in the lift-up apparatus U2 of the second embodiment shown in FIG. 13.

The lift-up apparatus U2 of the second embodiment is constructed by the constitution the same as that of the lift-up apparatus U1 of the first embodiment except the attaching bracket 57, and therefore, the same members are attached with the same notations and a detailed explanation thereof will be omitted.

Figure 15:
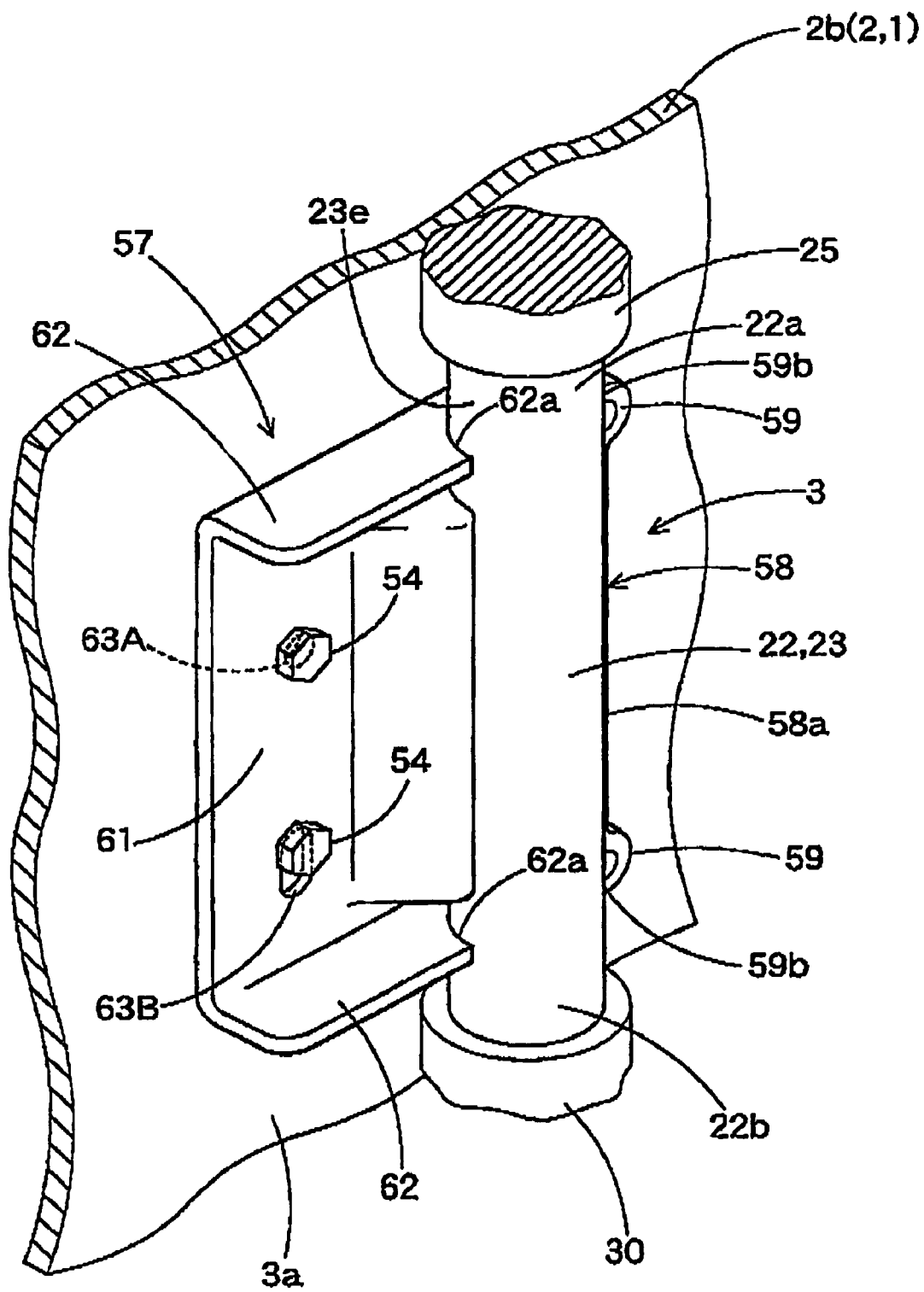
FIG. 15 is a partially enlarged outline perspective view showing a cylinder of an actuator and the attaching bracket of the hood lift-up apparatus according to the second embodiment.

As shown by FIGS. 13, 15, the attaching bracket 57 is constituted by making a width dimension in an up and down direction thereof more or less smaller than a width dimension in the up and down direction of the main body 23 to be able to hold an outer peripheral face side of the main body 23 of the cylinder 22 substantially over an entire region in the up and down direction. The attaching bracket 57 is constituted to include a holding portion 58 disposed on a rear portion side constituting a side of the cylinder 22, and the attaching portion 61 arranged on the front side of the cylinder 22 by being extended from the holding portion 58 to the front side, which are made by a sheet metal, and is fixed to the attaching seat 3 at a portion of the attaching portion 61. In the case of the embodiment, the attaching bracket 57 is formed by pressing a sheet metal material of a predetermined shape.

Figure 14:
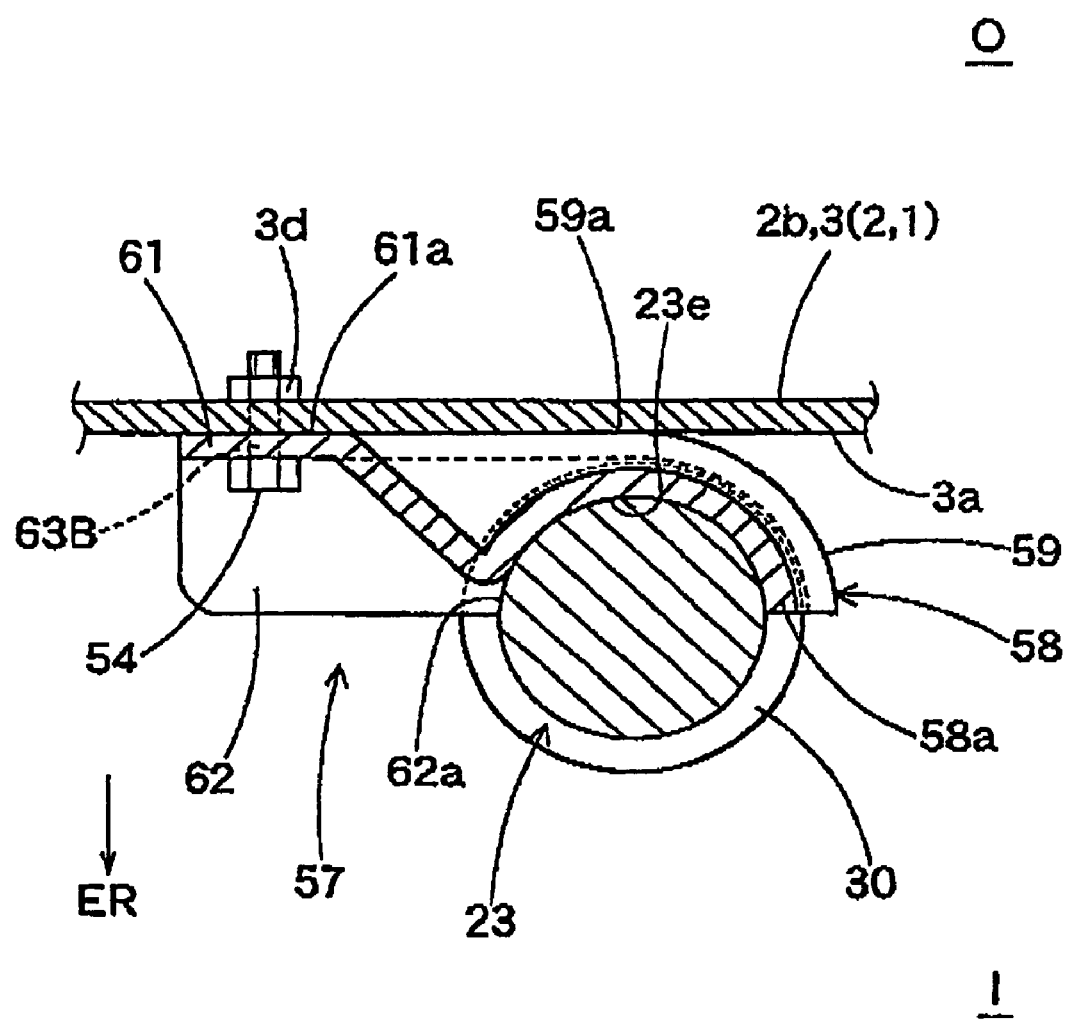
FIG. 14 is an outline cross-sectional view showing an attaching bracket of the hood lift-up apparatus of the second embodiment, in correspondence with XIV-XIV of FIG. 13.
Figure 16:
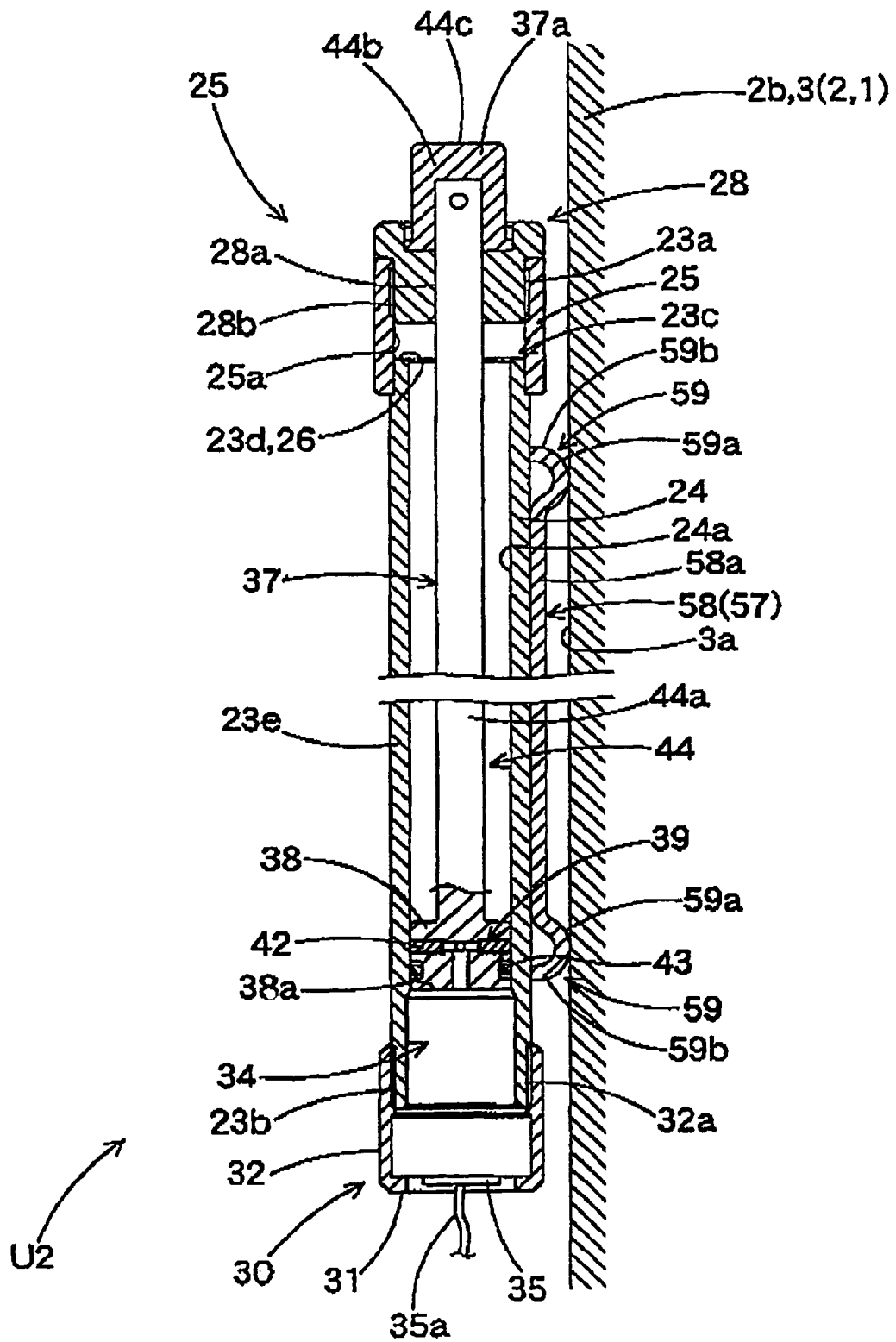
FIG. 16 is an outline vertical sectional view of the actuator of the hood lift-up apparatus according to the second embodiment.

The holding portion 58 is constituted by being bent to cover a side of the hood ridge reinforce 2 (vehicle outer side O) substantially over a half periphery from a rear face side to a front face side at the outer peripheral face 23e of the main body 23 of the cylinder 22. That is, according to the holding portion 58, as shown by FIG. 14, a sectional shape along the front and rear direction constituting a side of a direction orthogonal to an axis of the cylinder 22 by a shape of a section of substantially a half circular arc constituted to cover the vehicle outer side O of the main body 23 substantially over a half periphery, and the holding portion 58 is constituted to hold the main body 23 of the cylinder 22 by fixedly attaching an inner peripheral face side thereof to the outer peripheral face 23e of the main body 23 of the cylinder 22. Further, the holding portion 58 includes reinforcing rib 59 constituting a sectional shape along the up and down direction constituting the axial direction of the cylinder 22 substantially by a shape of a semicircular arc over an entire region in the front and rear direction (refer to FIGS. 13, 15, 16). In the case of the embodiment, an outer peripheral face 59a of the reinforcing rib 59 is constituted to be disposed on a plane the same as that of a vehicle outer side face 61a of the attaching portion 61 (refer to FIGS. 15, 16). In other words, the holding portion 58 is constituted such that when the attaching portion 61 is fastened to the attaching seat 3 by the bolt 54, the outer peripheral face 59a of the reinforcing rib 59 is brought into contact with the attaching face 3a of the attaching seat 3. Further, the main body 23 of the cylinder 22 is supported by the attaching seat 3 by way of the reinforcing rib 59 provided at the holding portion 58 in being mounted to the vehicle. Further, the reinforcing rib 59 is constituted such that outer peripheral edges 59c of end edge portions 59b disposed on sides of both upper and lower ends remote from a bent portion 58a mentioned later are brought into contact with the outer peripheral face 23e of the main body 23 of the cylinder 22.

As shown by FIGS. 13, 15, the attaching portion 61 is constituted as a shape of a plate extended to the front side from portions of the holding portion 58 and the reinforcing rib 59 disposed on the vehicle outer side O the most by making a width dimension in the up and down direction substantially the same as a width dimension in the up and down direction of the holding portion 58 and making the vehicle outer side face 61a in flash therewith. The attaching portion 61 is constituted substantially by the shape of the plate substantially along the front and rear direction and substantially along the vertical direction to make the vehicle outer side face 61a in line with the attaching face 3a, and includes flange portions 62 formed to be continuous from the end edge portions 59b disposed on the sides of the both upper and lower ends of the reinforcing rib 59 of the holding portion 58 on sides of both upper and lower ends thereof. In the case of the embodiment, rear edges 62a of the flange portions 62 are constituted to be respectively brought into contact with the outer peripheral face 23e of the main body 23 to support the front face side of the main body 23 (refer to FIGS. 14, 15). The attaching portion 61 is formed with attaching holes 63A, 63B for inserting bolts 54 constituting attaching means at two portions along the up and down direction (refer to FIG. 15). In the case of the embodiment, the attaching hole 63A arranged on an upper side is constituted by substantially a circular shape and the attaching hole 63B arranged on a lower side is constituted by a shape of a long hole a longitudinal direction of which is made to be in line with the up and down direction to be able to absorb an integrating error. Further, the attaching portion 61 is constituted to be fixed to the attaching seat 3 by fastening the bolts 54 to nuts 3d fixedly attached to the attaching seat 3 in a state of being inserted through the attaching holes 63A, 63B.

In the case of the embodiment, although the holding portion 58 and the attaching portion 61 are constituted by constituting the width dimensions in the up and down direction the same as each other, at a region of the holding portion 58 excluding the reinforcing ribs 59, 59, in other words, at a region of the bent portion 58a constituted by constituting a sectional shape along the front and rear direction constituting the side of the direction orthogonal to the axis of the cylinder 22 by the sectional shape of substantially the half circular arc constituted to cover the vehicle outer side O of the main body 23 substantially over the half periphery and constituted by fixedly attaching the inner peripheral face side to the outer peripheral face side of the main body 23 of the cylinder 22, a width dimension thereof in the up and down direction is set to be smaller than the width dimension in the up and down direction of the attaching portion 61. However, the region of the bent portion 58a is arranged over a range wider in the up and down direction than that of a region of arranging attaching holes 63A, 63B mentioned later of the attaching portion 61. In other words, the bent portion 58a is constructed by a constitution of holding the main body 23 of the cylinder 22 by supporting the front face side and the rear face side of the main body 23 of the cylinder 22 at a region along the up and down direction including a region on the rear side of the attaching hole 63A on the upper end side of the attaching portion 61 and a region on the rear side of the attaching hole 63B on the lower end side. The bent portion 58a is constituted to be projected to the vehicle inner side I relative to the attaching portion 61 to be able to cover the front face side of the main body 23, the shape of projecting the bent portion 58a is constituted to be continuous to the attaching portion 61 by being inclined smoothly over to the attaching portion 61 in a section along the front and rear direction to be converged over to the front side constituting the side of the attaching portion 61 by constituting an apex by a portion brought into contact with the front face of the main body 23.

Also according to the lift-up apparatus U2 of the second embodiment using such an attaching bracket 57, the actuator 21 is fixed to the hood ridge reinforce 2 by utilizing the attaching bracket 57 having the holding portion 58 of holding the main body 23 of the cylinder 22 and the attaching portion 61 extended to the front side from the holding portion 58 and arranged on the front side of the main body 23 of the cylinder 22, and utilizing only the portion of the attaching portion 61, and therefore, a simple constitution can be constructed, further, operation time in fixing can be reduced and also a number of fabricating steps can be reduced.

Therefore, also in the lift-up apparatus U2 of the second embodiment, the apparatus can be fixed to the hood ridge reinforce 2 constituting the body member easily by a simple constitution.

Figure 17:
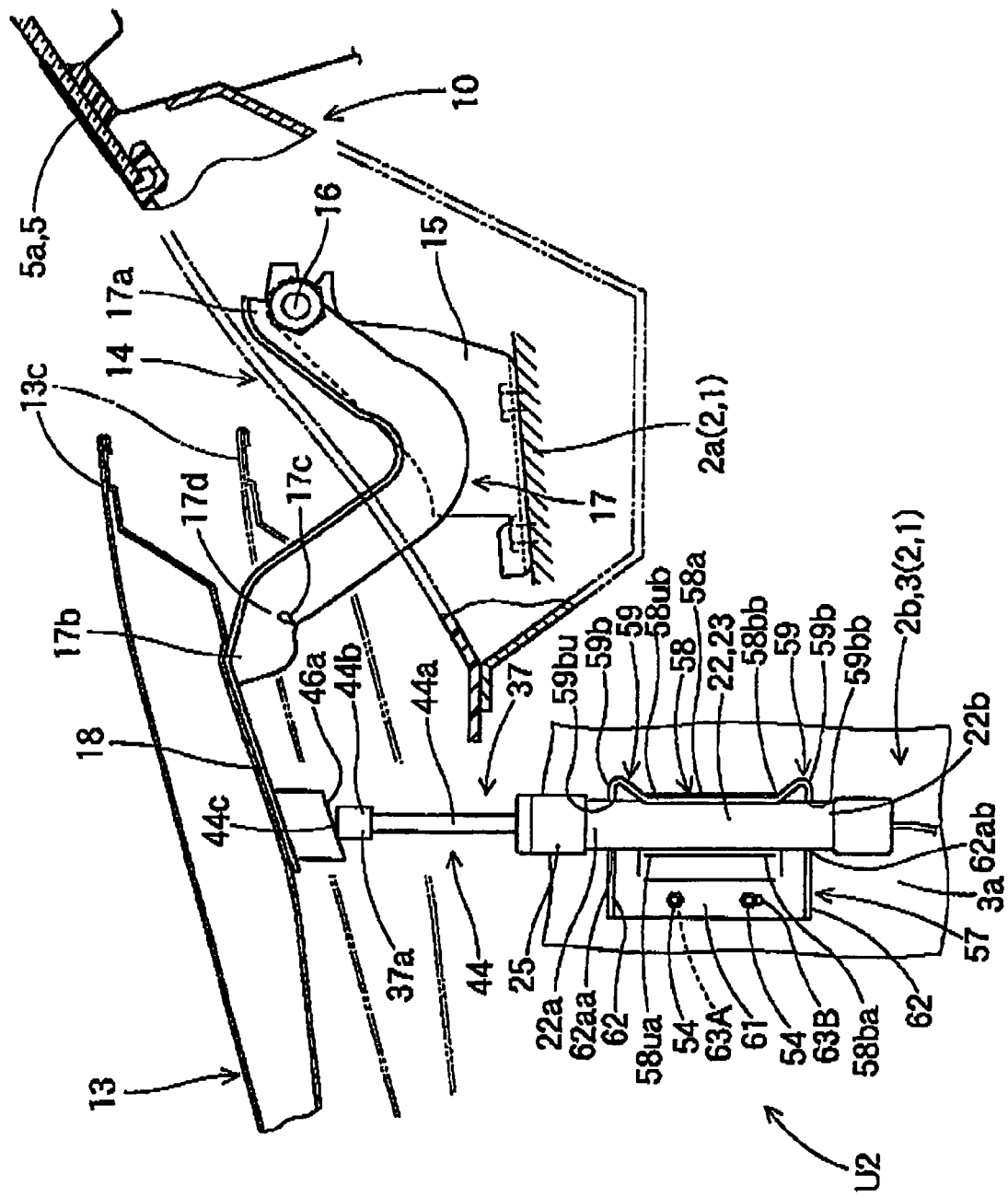
FIG. 17 is an outline vertical sectional view showing time of operating the hood lift-up apparatus according to the second embodiment.
Figure 18:
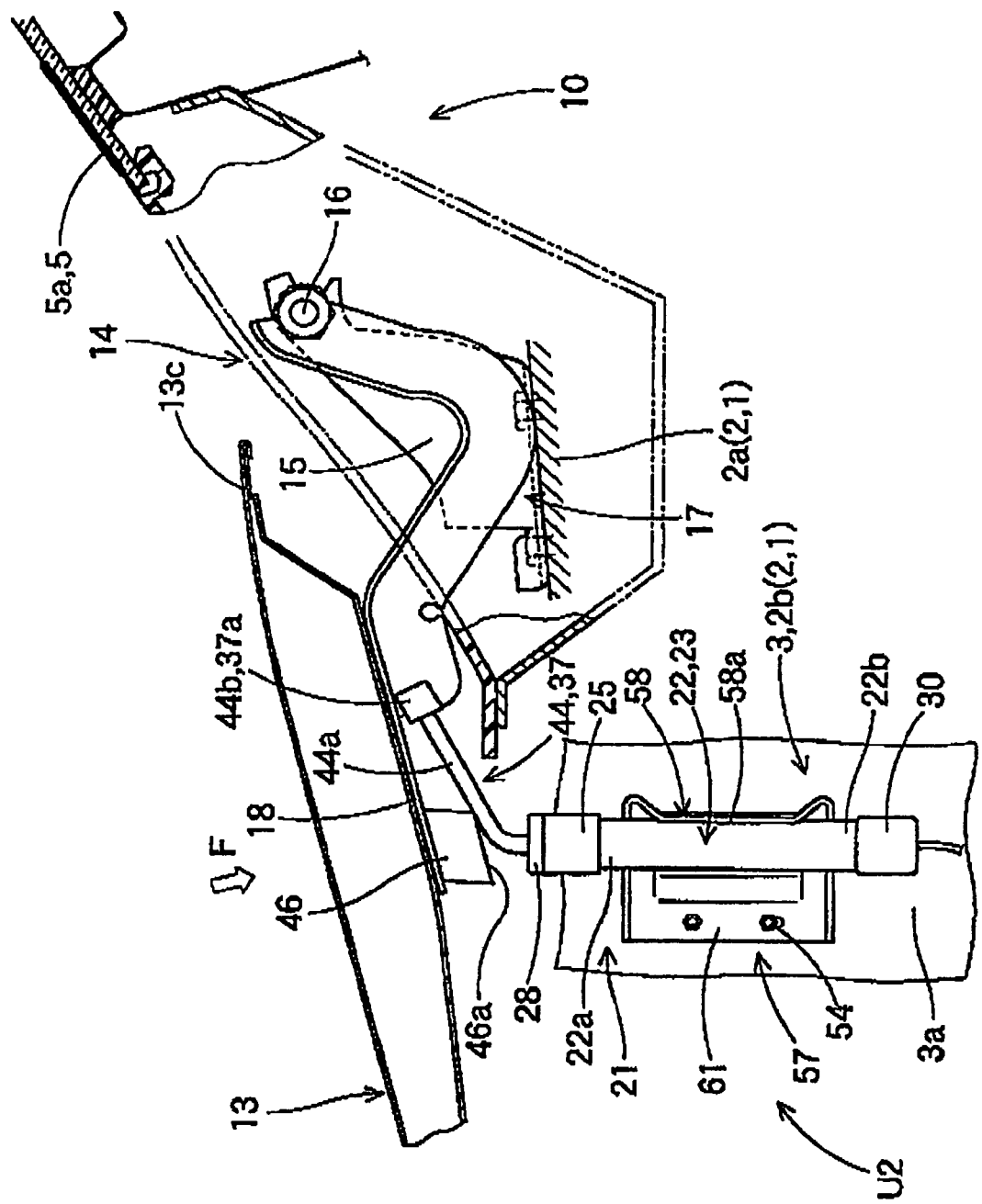
FIG. 18 is an outline view showing a state of plastically deforming a support rod of the actuator in the hood lift-up apparatus according to the second embodiment.

Further, also in the lift-up apparatus U2 of the second embodiment, as shown by FIG. 17, when the hood panel 13 moving up the rear end 13c receives the pedestrian after operating the actuator 21, as shown by FIG. 18, the piston rod 37 (the shaft portion 44a of the support rod 44) bringing the head portion 44b on the side of the upper end 37a into contact with the lower face side (lower face 46a of the receiving seat 46) of the rear end 13c of the hood panel 13 is bent to plastically deform to direct to the head portion 44b on the side of the upper end 37a to the rear side, and the kinetic energy F of the pedestrian is absorbed. At this occasion, also in the lift-up apparatus U2 of the second embodiment, since the actuator 21 is extended to the front side from the holding portion 58 of holding the main body 23 of the cylinder 22, and is fixed to the hood reinforce 2 at the portion of the attaching portion 61 of the bracket 57 arranged on the front side of the cylinder 22, and therefore, when the pedestrian is butted to the rear end 13c of the hood panel 13 to push down the hood panel 13 and the force of pushing down to the rear lower side is operated to the upper end 37a of the piston rod 37, the cylinder 22 is operated with only the rotational moment of rotating to direct the side of the upper end 22a to the rear side by constituting the fulcrum by the portion of the attaching portion 61 constituting the front side of the center axis C2 (refer to FIG. 13) (in details, a portion between the bolts 54, 54 constituting the center in the up and down direction of the attaching portion 61). In other words, also in the lift-up apparatus U2 of the second embodiment, when the hood panel 13 is pushed down, the rotational moment of rotating to direct the side of the upper end 22A to the front side is not generated in the cylinder 22. Therefore, the cylinder 22 is not moved to rotate to hamper the bending plastic deformation of the piston rod 37 to the rear side, and the piston rod 37 can firmly be bent to plastically deform to direct the upper end 37a to the rear side. As a result, also in the lift-up apparatus U2 of the second embodiment, the piston rod 37 can stably be bent to plastically deform to the rear side, and the kinetic energy F of the pedestrian can stably be absorbed.

Further, also in the lift-up apparatus U2 of the second embodiment, the attaching portion 61 of the attaching bracket 57 includes 2 pieces of the attaching holes 63A, 63B of inserting the bolts 54 constituting the attaching means for fixing to the attaching seat 3 substantially along the up and down direction, and therefore, the holding portion 58 per se of supporting the main body 23 of the cylinder 22 can solidly be attached to the hood ridge reinforce 2 by restraining rocking in the front and rear direction by the attaching portion 61, further, also in the lift-up apparatus U2 of the second embodiment, the bent portion 58a of the holding portion 58 supports the front face side and the rear face side of the main body 23 of the cylinder 22 over substantially an entire region in the up and down direction including the region on the rear side of the attaching hole 63A on the upper end side and the region on the rear side of the attaching hole 63B on the lower end side, and supports the main body 23 of the cylinder 22, and therefore, the sides of the end portions (upper end 22a, lower end 22b) in the up and down direction of the cylinder 22 can firmly be prevented from being rotated along the front and rear direction.

Also in the lift-up apparatus U2 of the second embodiment, as shown by FIG. 17, at the initial stage of the bending plastic deformation of the piston rod 37, at the region on the rear side of the attaching hole 63A on the upper end side, a rear upper edge portion 58ub of the bent portion 58a supports the rear face of the main body 23, at the region on the rear side of the attaching hole 63B of the lower end side, a rear lower edge portion 58ba of the bent portion 58a supports the rear face of the main body 23, in the state of progressing the bending plastic deformation, at the region on the rear side of the attaching hole 63A on the upper end side, a front edge portion 58ua of the bent portion 58a supports the front face of the main body 23, at the region on the rear side of the attaching hole 63B on the lower end side, a rear lower edge portion 58bb of the bent portion 58a supports the rear face of the main body 23, and therefore, it can precisely be prevented that the cylinder 22 is rotated to direct the side of the upper end 22a or the side of the lower end 22b to the front side by receiving the rotational moment operated during a time period from the initial stage to the final stage of the bending plastic deformation. Particularly, in the attaching bracket 57 of the second embodiment, in addition to the bent portion 58a of the holding portion 58, also at the inner peripheral edge 59c of the reinforcing rib 59 and the rear edge 62a of the flange portion 62 of the attaching portion 61, the outer peripheral face 23e of the main body 23 is supported, and therefore, in the bending plastic deformation, a rear upper edge portion 59bu and a rear lower edge portion 59bb of the inner peripheral edge 59bu of the reinforcing flange 59, and an upper side portion 62aa and a lower side portion 62ab of the rear edge 62a of the flange portion 62 support the outer peripheral face 23e of the main body 23, and the outer peripheral face 23e of the main body 23 can further solidly be supported.

Further, although in the embodiment, in the two attaching holes 63A, 63B, the attaching hole 63B on one side arranged on the lower side is constituted by the shape of the long hole the longitudinal direction of which is along the upper and lower direction, and therefore, the integrating error in attaching to the attaching seat 3 can be absorbed, and an increase in a number of integrating steps can be restrained, naturally, when such a point is not taken into consideration, as in the lift-up apparatus U1 of the first embodiment, there may be constructed a constitution in which all of attaching holes are opened substantially in a circular shape.

Further, although in the lift-up apparatus U1, U2 of the first and the second embodiments, the bent portions (bent plate portions) 52, 58a of the holding portions 50, 58 of the attaching brackets 48, 57 are constituted to be wide in widths in the up and down direction in correspondence with the regions of the attaching holes 49a, 63, naturally, the shape of the bent portion is hot limited thereto but there may be constructed a constitution of arranging bent portions substantially in a semicircular arc shape respectively separated to the region on the rear side of the attaching hole on the upper end side and the region on the rear side of the attaching hole on the lower end side.

Further, although in the lift-up apparatus U1, U2 of the first and the second embodiment, there is constructed a constitution in which the attaching portions 49 and 61 of the attaching brackets 48 and 57 are constituted by the shape of the plate substantially along the vertical direction and are fixed to the attaching seat 3 constituted by the wall portion 2b on the side of the engine room ER of the hood ridge reinforce 2, there may be used a constitution including an attaching portion 68 in a shape of a plate substantially along a horizontal direction as the attaching bracket 66 as in a lift-up apparatus U3 shown in FIGS. 19 through 22. In the lift-up apparatus U3 of the third embodiment except the attaching bracket 60, the apparatus is constructed by a constitution the same as that of the lift-up apparatus U1 of the first embodiment, and therefore, the same members are attached with the same notations and a detailed explanation thereof will be omitted. Further, in the lift-up apparatus U3 of the third embodiment, there is constructed a constitution of fixing the attaching portion 68 of the attaching bracket 66 to an attaching seat 3A extended from the wall portion 2b on the side of the engine room ER of the hood ridge reinforce 2 substantially in the horizontal direction.

Figure 19:
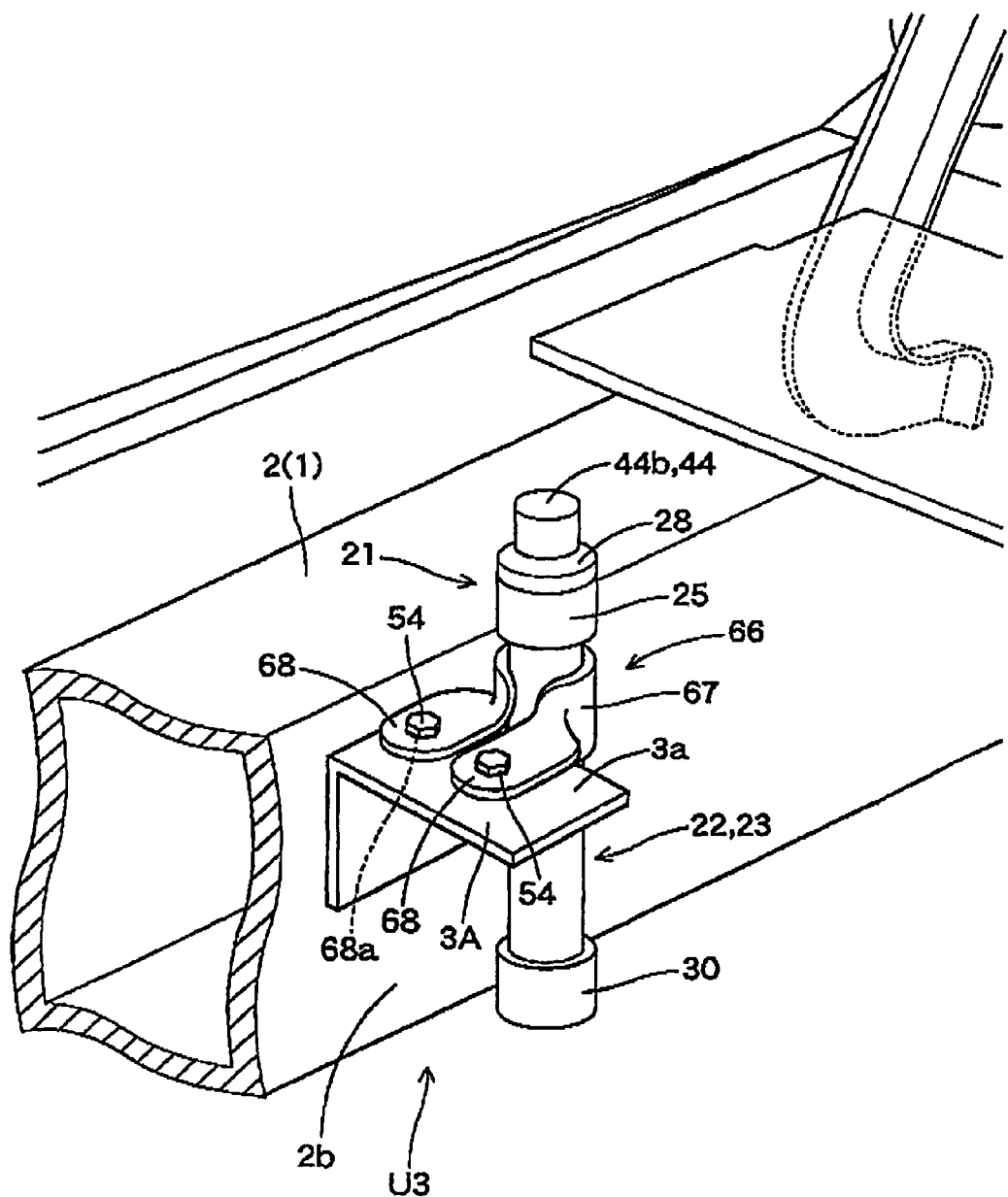
FIG. 19 is a partially enlarged outline perspective view showing a hood lift-up apparatus according to a third embodiment of the invention.
Figure 20:
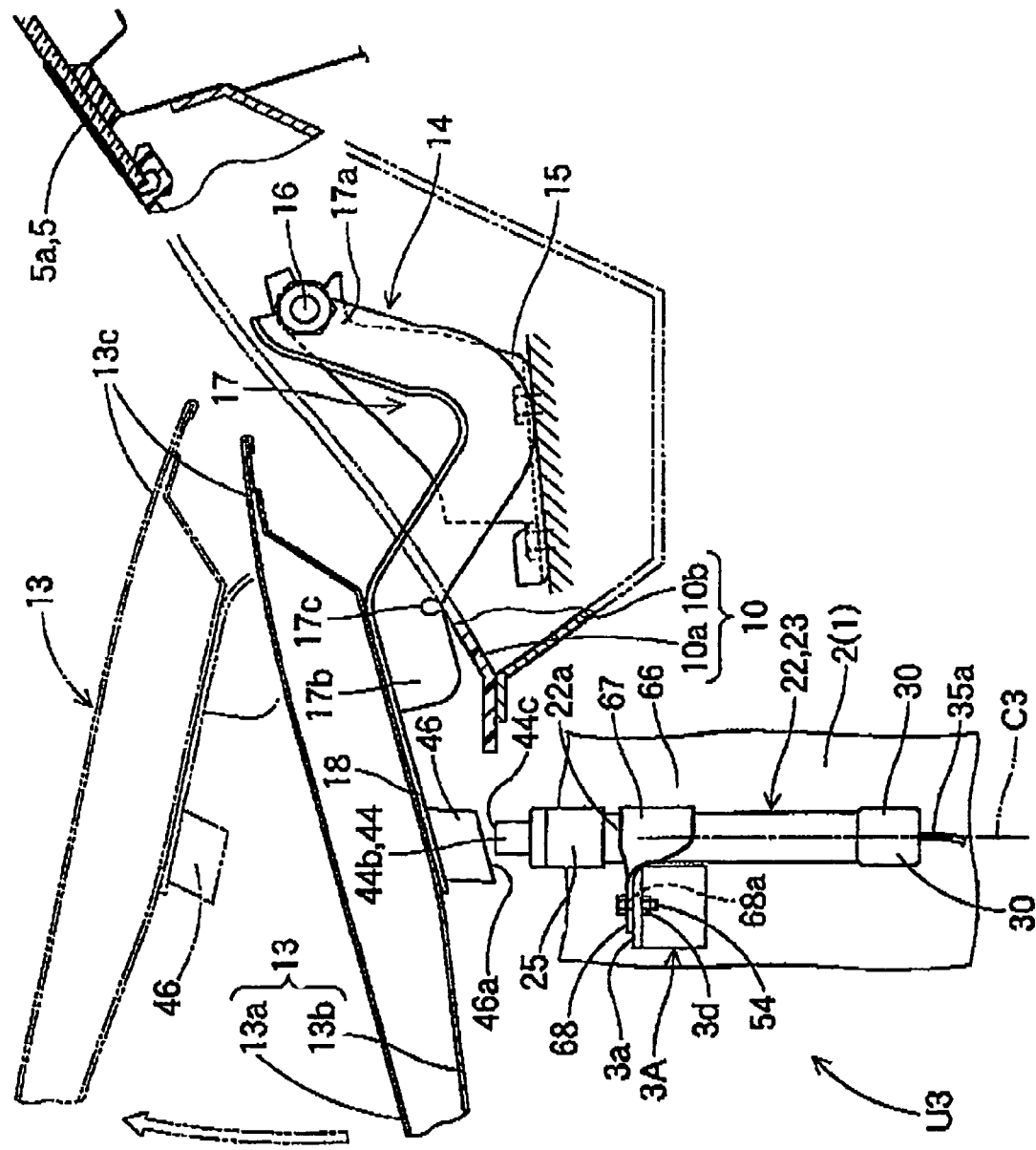
FIG. 20 is an outline vertical sectional view along a front and rear direction showing the hood lift-up apparatus according to the third embodiment and a hinge portion of a vehicle.

As shown by FIGS. 19, 20, the attaching bracket 66 is constructed by a constitution of capable of holding a portion at a vicinity of an upper end of the main body 23 of the cylinder 22, in the case of the embodiment, the attaching bracket 66 is made of a sheet metal and is constituted to include a holding portion 67 substantially in a shape of a strip bent to be able to hold the outer peripheral face of the main body portion 23 of the cylinder 22 over an entire region except a vicinity of a front end thereof, and two of the attaching portions 68, 68 arranged on the front side of the cylinder 22 by being extended to the front side from both ends of the holding portion 67 along the peripheral direction of the cylinder 22. That is, in the case of the embodiment, the attaching bracket 66 is constructed by a constitution of including the two attaching portions 68, 68 arranged at two portions along the left and right direction. Further, the holding portion 67 is constituted to hold a surrounding of the cylinder 22 over an entire region along a direction around the axis except a front end side thereof. The respective attaching portions 68 are constituted by substantially the shape of the plate substantially along the attaching face 3a substantially along the horizontal direction of the attaching seat 3A, and are respectively arranged at positions constituting the front side of the center axis C3 (refer to FIG. 20) of the cylinder 22. The respective attaching portions 68 are respectively formed with attaching holes 68a for inserting bolts 54 constituting the attaching means, and the attaching portions 68 are fixed to the attaching seat 3A by inserting the bolts 54 through the attaching holes 68a to be fastened to nuts 3d fixedly attached to the attaching seat 3A in a state of being brought into contact with the attaching face 3a of the attaching seat 3A.

Also in the lift-up apparatus U3 using such an attaching bracket 66, the actuator 21 is fixed to the attaching seat 3A extended from the hood ridge reinforce 2 by utilizing the attaching bracket 66 having the holding portion 67 of holding the main body 23 of the cylinder 22 and the attaching portions 68, 68 arranged on the front side of the main body 23 of the cylinder 22 by being extended to the front side from the holding portion 67, and utilizing only portions of the attaching portion 68, and therefore, a simple constitution can be constructed, further, operation time in fixing can be reduced, and a number of fabricating steps can be reduced.

Therefore, also in the lift-up apparatus U3 of the third embodiment, the apparatus can be fixed to the hood ridge reinforce 2 constituting the body member easily by a simple constitution.

Figure 21:
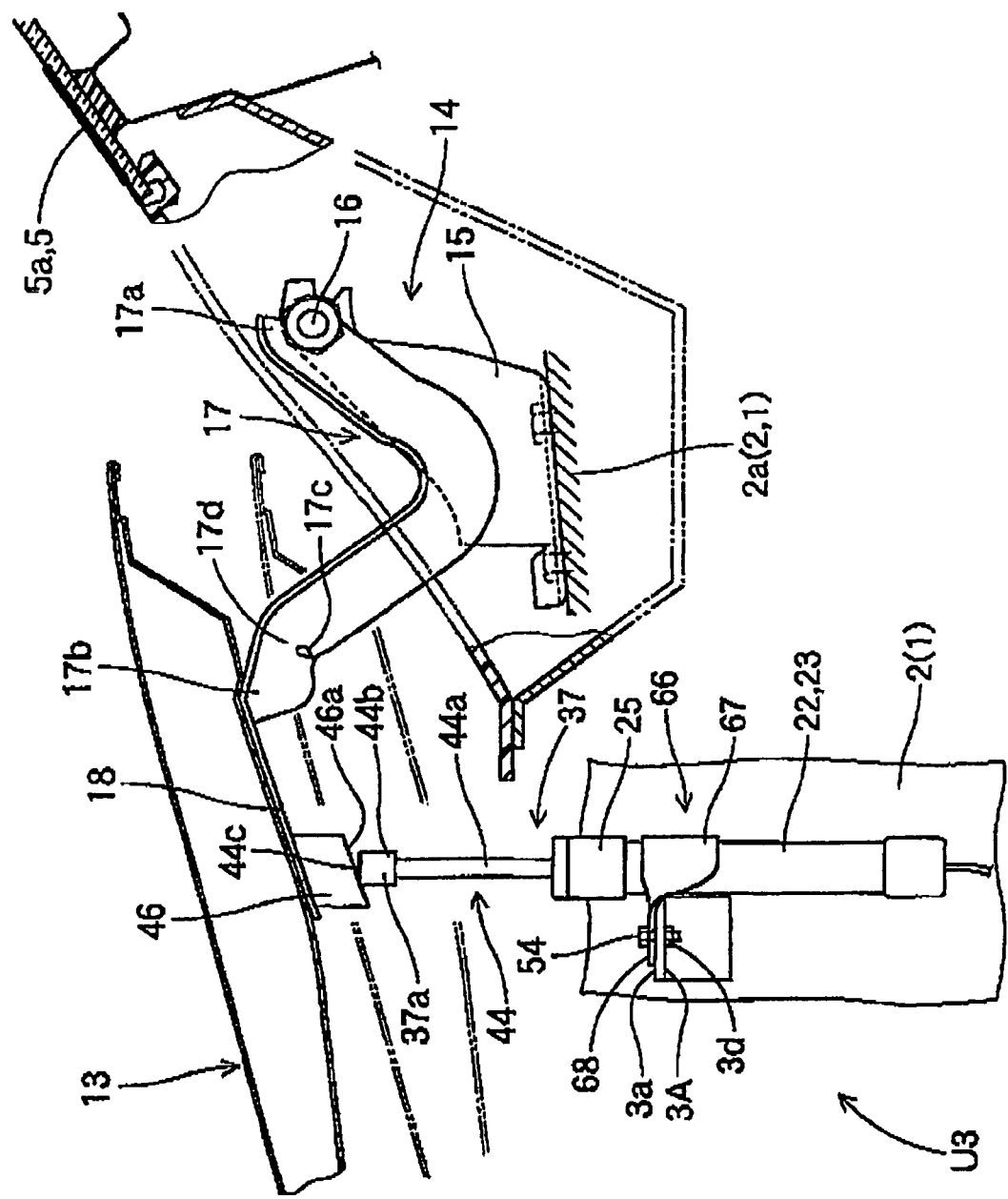
FIG. 21 is an outline vertical sectional view showing time of operating the hood lift-up apparatus according to the third embodiment.
Figure 22:
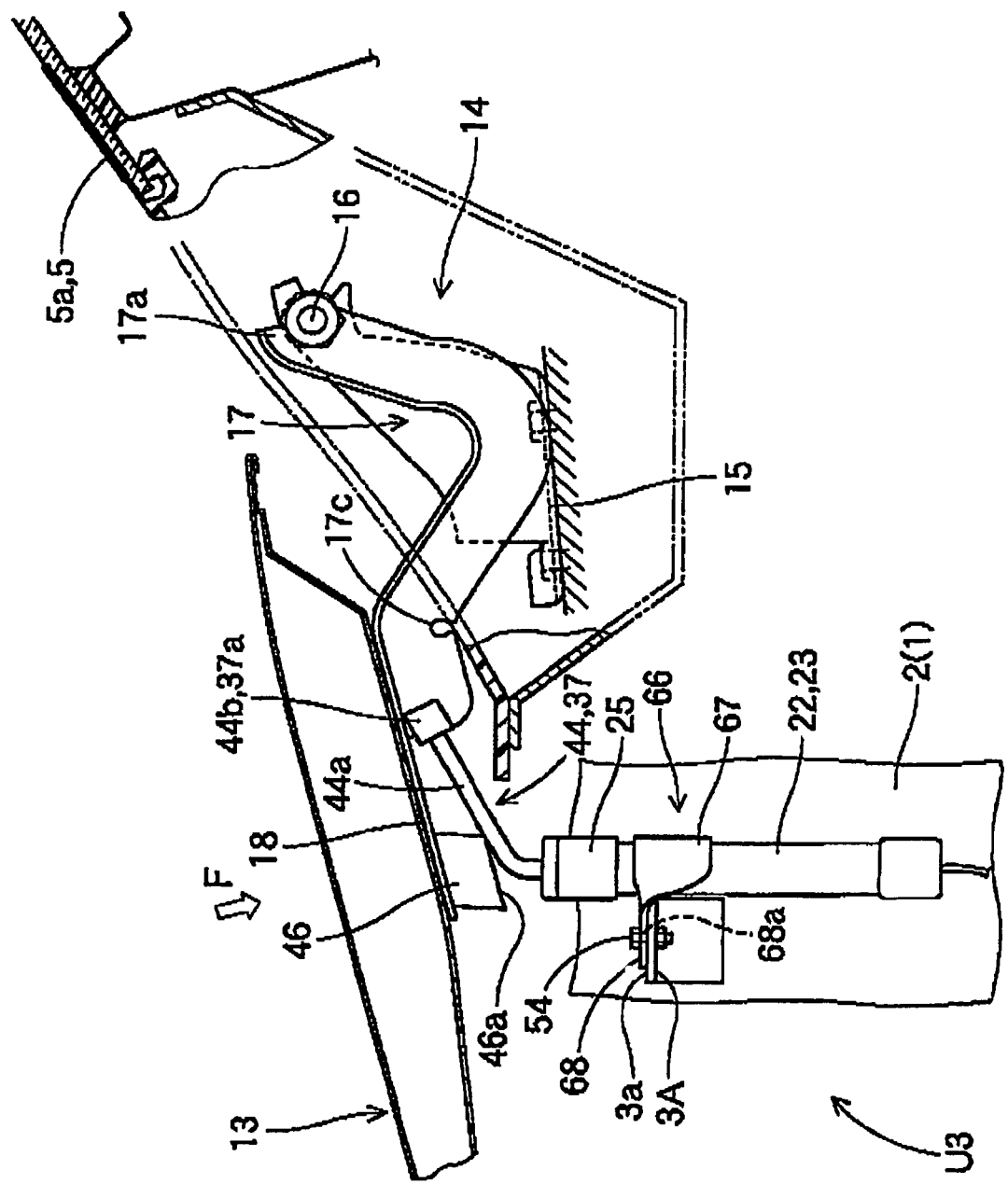
FIG. 22 is an outline view showing a state of plastically deforming a support rod of the actuator in the hood lift-up apparatus according to the third embodiment.

Further, also in the lift-up apparatus U3 of the third embodiment, as shown by FIG. 21, when the hood panel 13 moving up the rear end 13c receives the pedestrian after operating the actuator 21, as shown by FIG. 22, the piston rod 37 (the shaft portion 44a of the support rod 44) of bringing the head portion 44b on the side of the upper end 37a into contact with the lower face side (lower face 46a of the receiving seat 46) of the rear end 13c of the hood panel 13 is bent to plastically deform to direct the head portion 44b on the side of the upper end side 37a to the rear side and the kinetic energy F of the pedestrian is absorbed. At this occasion, even in the lift-up apparatus U3 of the third embodiment, the actuator 21 is fixed to the attaching seat 3A extended from the hood ridge reinforce 2 at the attaching portion 68 of the attaching bracket 66 extended to the front side from the holding portion 67 of holding the main body 23 of the cylinder 22 and arranged on the front side of the cylinder 22, and therefore, when the pedestrian is butted to the rear end 13c of the hood panel 13 to push down the hood panel 13 and the force of pushing down to direct the upper end 37a of the piston rod 37 to the rear lower side is operated, the cylinder 22 is operated with only the rotational moment of rotating by directing the side of upper end 22a to the rear side by constituting the fulcrum by the portion of the attaching portion 68 constituting the front side of the center axis C3 (refer to FIG. 20). In other words, even in the lift-up apparatus U3 of the third embodiment, when the hood panel 13 is pushed down, the rotational moment of rotating to direct the side of the upper end 22a to the front side is not generated at the cylinder 22. Therefore, the cylinder 22 is not moved to rotate to hamper the bending plastic deformation of the piston rod 37 to the rear side, and the piston rod 37 can firmly be bent to plastically deform to direct the upper end side 37a to the rear side. As a result, also in the lift-up apparatus U3 of the third embodiment, the piston rod 37 can stably be bent to plastically deform to the rear side and the kinetic energy F of the pedestrian can stably be absorbed.

Further, although in the lift-up apparatus U1, U2, U3 of the first through the third embodiments, the actuator 21 is fixed to the hood ridge reinforce 2, the body member of the vehicle of fixing the actuator is not limited thereto but, for example, there may be constructed a constitution of extending the attaching bracket (attaching seat) having an attaching face along the front and rear direction and the vertical direction is extended from the cowl panel 10a, and the actuator 21 is fixed to the cowl panel 10a by way of the attaching bracket. Further, although in the case of the embodiment, the actuator 21 is fixed to the side of the engine room ER (vehicle inner side I) of the hood ridge reinforce 2, as described above, when the attaching seat is formed by being extended from the cowl panel 10a, there may be constructed a constitution of fixing the actuator by constituting the attaching face by the face constituting the vehicle outer side of the attaching seat.

What is claimed is:

1. A hood lift-up apparatus for a vehicle, comprising:
the hood lift-up apparatus being arranged under a hood panel of a vehicle at a rear end of the hood panel;
an actuator including a cylinder fixed to a body member of the vehicle, an axial direction of the cylinder being in line with a vertical direction;
a piston rod arranged within the cylinder and adapted to project upwardly from the cylinder, the piston rod being plastically deformable; and when a pedestrian-shaped object collides with a front end of the vehicle and the pedestrian-shaped object contacts the hood panel; the piston projects upwardly from the cylinder, an upper end of the piston contacts a lower face of the rear end of the hood panel and moves the rear end of the hood panel upward, and the upper end of the piston rod plastically deforms in a rearward direction relative to the vehicle;

an attaching bracket including a holding portion holding the cylinder and an attaching portion securing the cylinder to the vehicle, the attaching portion of the attaching bracket extending from the holding portion toward a front of the vehicle and being fixed to the body member only at a portion of the attaching portion that is located on a front side of the cylinder relative to the vehicle, the holding portion of the attaching bracket including a bent portion arranged on the front side of the cylinder and extending substantially over a half periphery of the cylinder and supporting a front face side and a rear face side of the cylinder by fixedly attaching an inner peripheral face of the attaching bracket to an outer peripheral face of the cylinder.

2. The hood lift-up apparatus according to claim 1, wherein:

the body member includes an attaching seat with an attaching face extending substantially along the vertical direction;

the attaching portion of the attaching bracket has a plate extending substantially along a front and rear direction of the vehicle, along substantially the vertical direction, and in alignment with the attaching face of the attaching seat;

the attaching portion of the attaching bracket further has a plurality of attaching holes receiving attaching means for fixing the attaching bracket to the attaching seat; and the bent portion of the holding portion of the attaching bracket covers the outer peripheral face of the cylinder at least in a region extending between the attaching holes.

3. The hood lift-up apparatus according to claim 1, further comprising a receiving seat secured to the hood panel directly above the upper end of the piston rod, the receiving seat having a lower face facing the upper end of the piston rod, the lower face of the receiving seat having an inclined surface relative to a horizontal direction that receives the upper end of the piston rod and forces the upper end of the piston rod in the rearward direction relative to the vehicle.

4. The hood lift-up apparatus according to claim 3, wherein an angle between the lower face of the receiving seat and the piston rod of the cylinder is within a range of 95° to 140°.

5. The hood lift-up apparatus according to claim 1, further comprising a sensor for sensing when a pedestrian-shaped object will collide with the front end of the vehicle.

6. The hood lift-up apparatus according to claim 1, further comprising a projected portion arranged and filling a gap between the cylinder, the attaching portion of the attaching bracket, and the attaching seat of the body member.

* * * * *